US010908851B2

(12) United States Patent
Shibata

(10) Patent No.: US 10,908,851 B2
(45) Date of Patent: Feb. 2, 2021

(54) COMMUNICATION SYSTEM AND INFORMATION PROCESSING APPARATUS THAT MANAGE LOG INFORMATION ABOUT AN EXTERNAL APPARATUS, AND CONTROL METHOD THEREFOR

(71) Applicant: CANON KABUSHIKI KAISHA, Tokyo (JP)

(72) Inventor: Daisuke Shibata, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/586,162

(22) Filed: Sep. 27, 2019

(65) Prior Publication Data

US 2020/0117401 A1    Apr. 16, 2020

(30) Foreign Application Priority Data

Oct. 15, 2018    (JP) .................................. 2018-194672

(51) Int. Cl.
*G06F 3/12* (2006.01)
*H04N 1/00* (2006.01)

(52) U.S. Cl.
CPC ............ *G06F 3/121* (2013.01); *G06F 3/1236* (2013.01); *H04N 1/00015* (2013.01); *H04N 1/00042* (2013.01); *H04N 1/00079* (2013.01); *H04N 2201/0094* (2013.01)

(58) Field of Classification Search
None
See application file for complete search history.

(56) References Cited

U.S. PATENT DOCUMENTS

| 2009/0109477 | A1* | 4/2009 | Oomura ................ G06F 3/1288 |
| | | | 358/1.15 |
| 2012/0293825 | A1* | 11/2012 | Ishii ..................... G06F 3/1207 |
| | | | 358/1.14 |
| 2017/0353615 | A1* | 12/2017 | Hasegawa ............ G06F 3/1234 |
| 2018/0141358 | A1* | 5/2018 | Akizuki ................... B41J 29/38 |
| 2020/0068090 | A1* | 2/2020 | Lee .................... H04N 1/32662 |

FOREIGN PATENT DOCUMENTS

| JP | 2010-61562 A | 3/2010 |
| JP | 2015-100013 A | 5/2015 |
| JP | 2017-68835 A | 4/2017 |
| JP | 2018-156642 A | 10/2018 |

* cited by examiner

*Primary Examiner* — Thomas D Lee

(74) *Attorney, Agent, or Firm* — Canon U.S.A., Inc. IP Division

(57) ABSTRACT

An information processing apparatus configured to manage operation log information about an external apparatus and communicate with a communication apparatus communicating with the external apparatus, includes at least one controller configured to acquire the operation log information about the external apparatus and to transmit, upon receiving a notification from the communication apparatus, state information based on the operation log information, to the communication apparatus. The notification indicates a communication error in communication between the external apparatus and the communication apparatus, wherein a message based on the state information is displayed on the communication apparatus.

17 Claims, 16 Drawing Sheets

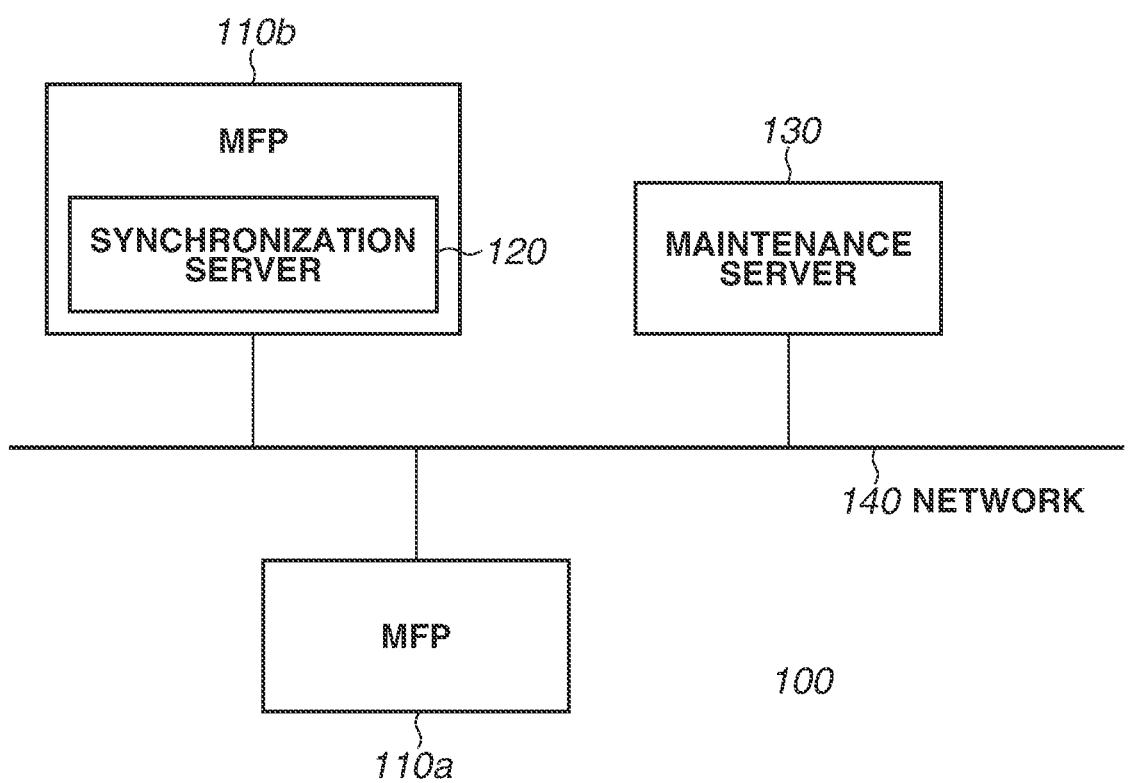

COMMUNICATION SYSTEM AND INFORMATION PROCESSING APPARATUS THAT MANAGE LOG INFORMATION ABOUT AN EXTERNAL APPARATUS, AND CONTROL METHOD THEREFOR

BACKGROUND

Field

The present disclosure relates to a communication system that uses an information processing apparatus to manage operation logs of apparatuses connected via a network. The information processing apparatus used for the communication system manages operation logs of communication apparatuses such as a copying machine, a facsimile (FAX), and a printer.

Description of the Related Art

A communication system in which a plurality of communication apparatuses cooperates with each other via a network has heretofore been known. Japanese Patent Application Laid-Open No. 2015-100013 discusses a technique for synchronizing settings held by a multi-function peripheral (MFP) serving as a server with settings held by an MFP serving as a client.

SUMMARY

In the communication system of Japanese Patent Application Laid-Open No. 2015-100013, if a failure occurs in communication between apparatuses, the apparatuses cannot cooperate with each other. In consideration thereof, it has now been determined that for a communication system to be able to be rapidly restored to the state where such a plurality of apparatuses could cooperate with each other after the occurrence of a failure, the communication system would be required to have a mechanism for identifying the cause of the failure. The present features a communication system which includes a plurality of apparatuses that can cooperate with each other and which is capable of providing a user with information about the cause of a communication failure.

For example, the present disclosure features a communication system capable of providing a user with information about each cause of a communication failure.

According to an aspect of the present disclosure, a communication system includes a communication apparatus configured to communicate with an external apparatus, and an information processing apparatus configured to manage operation log information about the external apparatus. The information processing apparatus includes at least one controller configured to acquire the operation log information about the external apparatus, and to transmit, upon receiving a notification from the communication apparatus, state information based on the operation log information to the communication apparatus. The notification indicates a communication error in communication between the external apparatus and the communication apparatus. The communication apparatus includes a display device configured to display information, and at least one controller configured to notify, upon detecting that the communication with the external apparatus is not performed normally, the information processing apparatus of the communication error, and to acquire the state information and cause the display device to display a message based on the state information.

Further features of the present disclosure will become apparent from the following description of exemplary embodiments with reference to the attached drawings.

BRIEF DESCRIPTION OF THE DRAWINGS

FIG. 1 illustrates an overall configuration of a system.

DESCRIPTION OF THE EMBODIMENTS

Figure 2A:
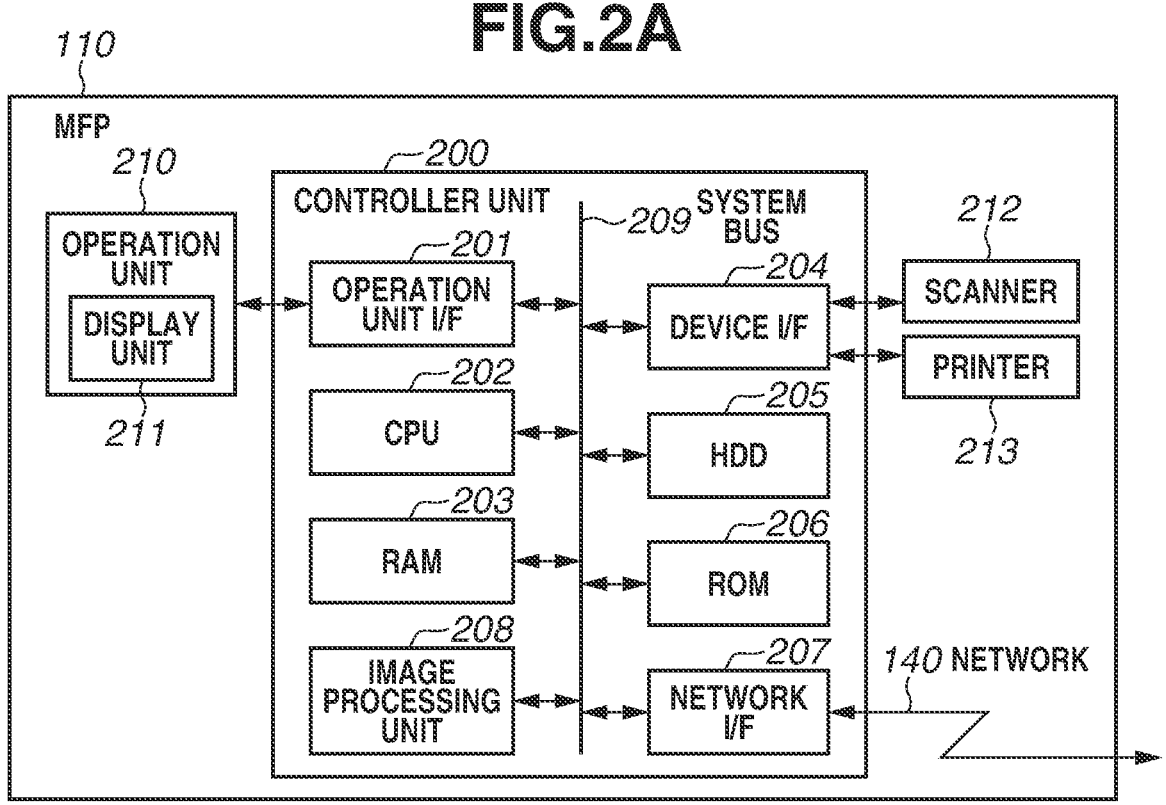
FIG. 2A illustrates a hardware configuration of a multi-function peripheral (MFP)

Modes for carrying out the present disclosure will be described below with reference to exemplary embodiments and the accompanying drawings. The scope of the present invention is not limited to the configuration described in the following exemplary embodiments. Part or all of the configuration can be replaced with equivalents as long as advantageous effects similar to those according to the present disclosure can be obtained.

A first exemplary embodiment of the present disclosure illustrates a communication error cause identifying system 100 (which is a communication system and is hereinafter referred to as the system 100) that identifies the cause of a failure in communication between multi-function peripherals (MFPs) based on operation log information stored in a maintenance server 130.

<System>

FIG. 1 illustrates the configuration of the system 100. The system 100 includes MFPs 110a and 110b and the maintenance server 130. The MFPs 110a and 110b and the maintenance server 130 are connected to each other via a network 140 so that the MFPs 110a and 110b and the maintenance server 130 can communicate with each other.

The maintenance server 130 is an apparatus that regularly or irregularly acquires operating states of apparatuses from which information is collected, and is capable of managing information about the acquired operating states. In the present case, the MFPs 110a and 110b (hereinafter collectively referred to as devices) are each designated as an information collection target. The maintenance server 130 acquires, from the devices, information about jobs processed by each device, information about the configuration of each device, and error information by establishing a communication with the devices, and records the acquired information. Thus, the maintenance server 130 can acquire operating states of all devices from which information is collected and information about jobs executed by the devices, and recognize an error state if a problem occurs in each device.

The MFP 110a and the MFP 110b are an image forming apparatus that implement various functions such as a copy function and a facsimile (FAX) function. The MFP 110a and the MFP 110b each store a setting value to be used when these functions are executed. An image forming apparatus realizing a single function, such as the copy function, the FAX function, or a scanner function, may be used instead of the MFP 110a and the MFP 110b.

Of the MFP 110a and the MFP 110b, the MFP 110b in the example illustrated in FIG. 1 includes a synchronization server 120. The synchronization server 120 is configured to manage synchronization processing to be performed on the setting value included in each of a plurality of devices. In the present exemplary embodiment, the term "synchronization" refers to processing in which, when the setting value managed by one of the synchronization server 120 and the MFP 110a is updated, the updated contents are reflected in the setting value managed by the other one of the synchronization server 120 and the MFP 110a so as to match the setting values between the synchronization server 120 and the MFP 110a. The present exemplary embodiment illustrates an example in which setting information is bidirectionally transmitted between the synchronization server 120 and the MFP 110a. However, the present disclosure is also applicable to a system in which setting information is transmitted unidirectionally.

<Use Case>

Figure 12:
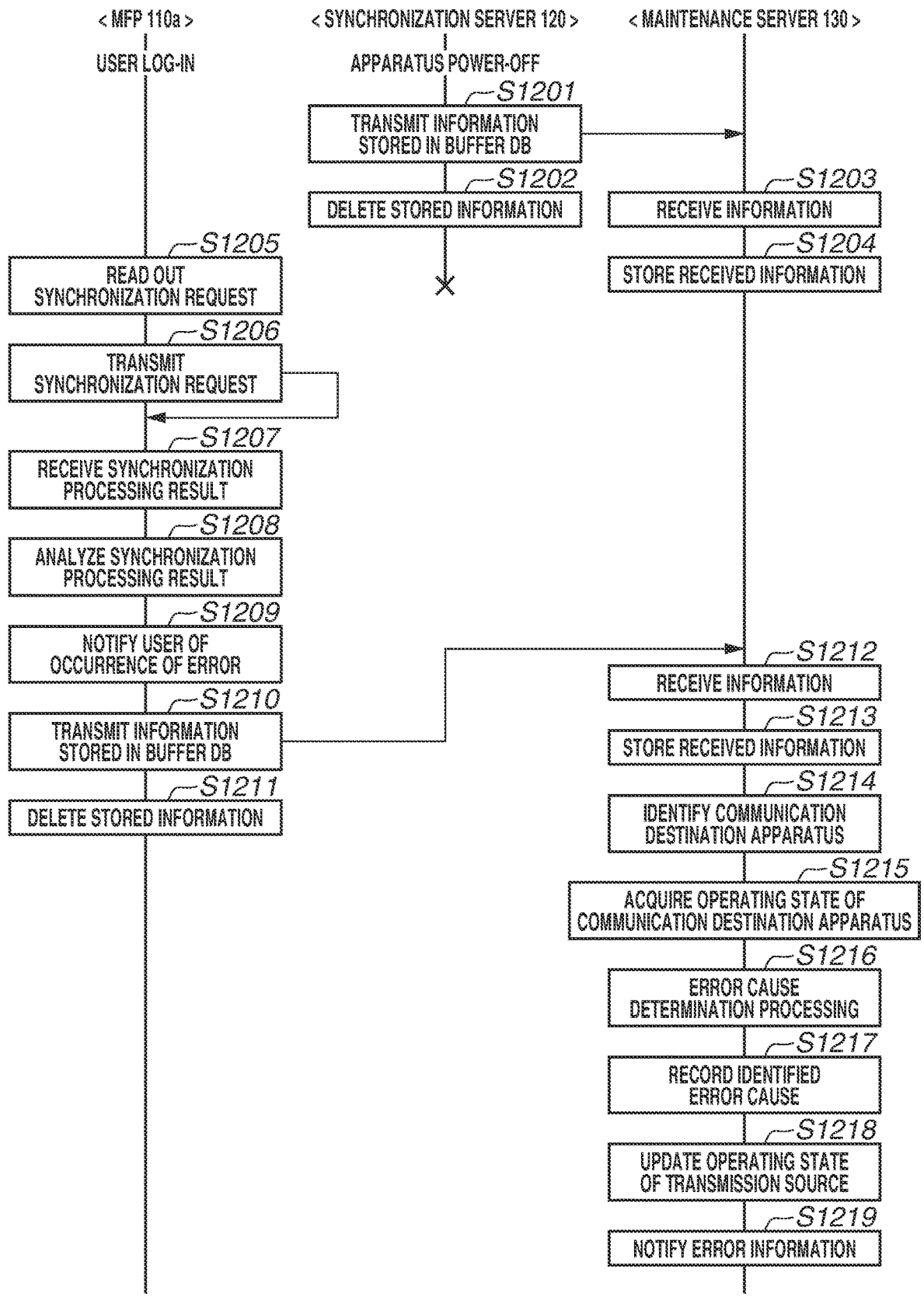
FIG. 12 illustrates a sequence for identifying the cause of an error based on operation logs.

According to the present exemplary embodiment, in a case where a communication failure occurs due to a power-off state of the MFP 110b, the cause of an error is identified based on operation logs stored in the maintenance server 130. FIG. 12 illustrates a sequence for identifying the cause of the error based on operation logs.

As illustrated in FIG. 12, the MFP 110b including the synchronization server 120 may cause the apparatus to shift to the power-off state according to a schedule which is instructed by a user, or is designated in advance. In this manner, when apparatus power-off processing is executed, the MFP 110b uses a data collection unit 421 of an information collection application 420 to collect power-off information about a power supply as information indicating a stop of the apparatus, and stores the collected information in a buffer database (DB) 426. In step S1201, the MFP 110b uses a data transmission unit 427 of the information collection application 420 to transmit, to the maintenance server 130, information stored in the buffer DB 426 which indicates the apparatus power-off state. In step S1202, the MFP 110b deletes information remaining in the buffer DB 426.

In step S1203, the maintenance server 130 receives the information transmitted from the MFP 110b. In step S1204, the maintenance server 130 stores the received information as collected data. Since the power-off information is received as information about the power supply in this case, the maintenance server 130 completes updating of the operation information, and waits until the next information is received.

After that, user log-in processing is performed on the MFP 110a. When the user logs in to the MFP 110a, the MFP 110a sends a synchronization processing start request to a client application 400. In the synchronization processing, user setting values associated with the functions included in the MFP 110a are synchronized. In step S1205, the client application 400 of the MFP 110a reads out a synchronization processing request, and in step S1206, the client application 400 transmits the synchronization processing request to the synchronization server 120. In this case, since the MFP 110b including the synchronization server 120 is in the power-off state, the transmission of the synchronization processing request fails. In step S1207, the MFP 110a acquires a synchronization processing result indicating that the communication is unsuccessful. In step S1208, the client application 400 of the MFP 110a analyzes the synchronization processing result. In step S1209, the client application 400 notifies the user of the occurrence of an error in the synchronization processing. The information collection application 420 of the MFP 110a detects that an error has occurred, collects information about an error with respect to a device state, and stores the error information in the buffer DB 426. If the error occurs with respect to the communication, the information collection application 420 of the MFP 110a records, as the error information, information about a communication destination apparatus and detailed information about the error. In step S1210, the information collection application 420 of the MFP 110a acquires the error occurrence information with respect to the synchronization processing from the buffer DB 426 and transmits the acquired information to the maintenance server 130. In step S1211, the information collection application 420 deletes the transmitted information from the buffer DB 426.

In step S1212, the maintenance server 130 receives the information transmitted from the MFP 110a. In step S1213, the maintenance server 130 stores the received information as the collected data. If the received information is error information about the error that has occurred in communication between apparatuses, in step S1214, the maintenance server 130 identifies the communication destination apparatus from the received information. In step S1215, the maintenance server 130 acquires previous operation information about the communication destination apparatus (MFP 110b in this case). In step S1216, the maintenance server 130 executes error cause determination processing using the acquired operation information about the communication destination apparatus. In the error cause determination processing, in step S1217, the maintenance server 130 determines, based on the operation information about the MFP 110b, which is the communication destination apparatus for communicating with the MFP 110a, that the communication destination apparatus is in the power-off state (state where the apparatus is not operating), and records the determination result as the cause of the error.

Upon receiving the result, the maintenance server 130 updates operating state information about the MFP 110a. In step S1218, as the updated operating state information, information indicating that "an error has occurred in synchronization processing" and information indicating that "the error has occurred due to the power-off state of the communication destination apparatus" are recorded.

When the operating state information is updated, in step S1219, the maintenance server 130 sends a notification indicating a synchronization processing error and the cause of the error. This notification may be sent anywhere as long as the user can confirm the contents of the notification. For example, when the notification is sent to the MFP 110a, a notification screen including information about the cause of the error is displayed on the MFP 110a, which enables the user to confirm the contents of the notification.

According to the method described above, if an error has occurred in the communication between the MFPs 110a and 110b, the cause of the error can be identified using the information stored in the maintenance server 130. The maintenance server 130 provides the user with the identified result, enabling the user to recognize the cause of the error. Thus, the user who has recognized the cause of the error can immediately perform a recovery work. Consequently, according to the present exemplary embodiment, it is possible to reduce a time used for performing an operation for restoration from the error. The present exemplary embodiment described above illustrates an example in which the function for synchronizing the setting values is used as the function using the communication between apparatuses. However, other functions may be used as the function using the communication between apparatuses. For example, the function for synchronizing the setting values may be replaced by a function for acquiring a print job input into the MFP 110b from the MFP 110a to execute a print operation. In the case where this function is used, if an error occurs in communication for acquiring the print job, the cause of the error can be identified.

<MFP>

FIG. 2A illustrates a hardware configuration of the MFP 110. Since the MFP 110a and the MFP 110b have the same configuration, the MFP 110a and the MFP 110b are hereinafter collectively referred to as the MFP 110. An example of the hardware configuration of the MFP 110 will be described with reference to FIG. 2A. The MFP 110 includes a controller unit 200, an operation unit 210, a scanner 212, and a printer 213. The controller unit 200 is connected to the operation unit 210 and is also connected to the scanner 212 and the printer 213.

The operation unit 210 is a user interface (UI) including buttons and a touch panel for inputting information, and a display (display unit 211) for outputting information. The scanner 212 is an image input device that scans a document and generates an image. The printer 213 is an image output device that forms an image on a sheet based on print data.

The controller unit 200 includes a central processing unit (CPU) 202. The CPU 202 activates an operating system (OS) using a boot program stored in a read-only memory (ROM) 206. Further, the CPU 202 executes application programs (hereinafter referred to as applications) stored in a hard disk drive (HDD) 205 on the OS, which executes various processes. A random-access memory (RAM) 203 is used as a working memory for the CPU 202, or is used as an image memory area for temporarily storing image data. The HDD 205 stores applications, image data, and setting values. A method for managing setting values in the MFP 110 will be described below.

Other than the ROM 206 and the RAM 203, an operation unit interface (I/F) 201, a device I/F 204, a network I/F 207, and an image processing unit 208 are connected to a system bus 209. The operation unit I/F 201 is an interface for connecting with the operation unit 210. The operation unit I/F 201 outputs screen data to be displayed on the display unit 211 to the operation unit 210. Further, the operation unit I/F 201 transmits information received from the user through the operation unit 210 to the CPU 202. The device I/F 204 is connected to the scanner 212 and the printer 213 and performs synchronous/asynchronous conversion on image data. The network I/F 207 is, for example, a local area network (LAN) interface, and transmits and receives data to and from each apparatus on the network 140. The image processing unit 208 performs processing such as input processing of image data scanned by the scanner 212, output processing of image data to the printer 213, image rotation/compression, resolution conversion, color space conversion, and tone conversion.

Figure 3:
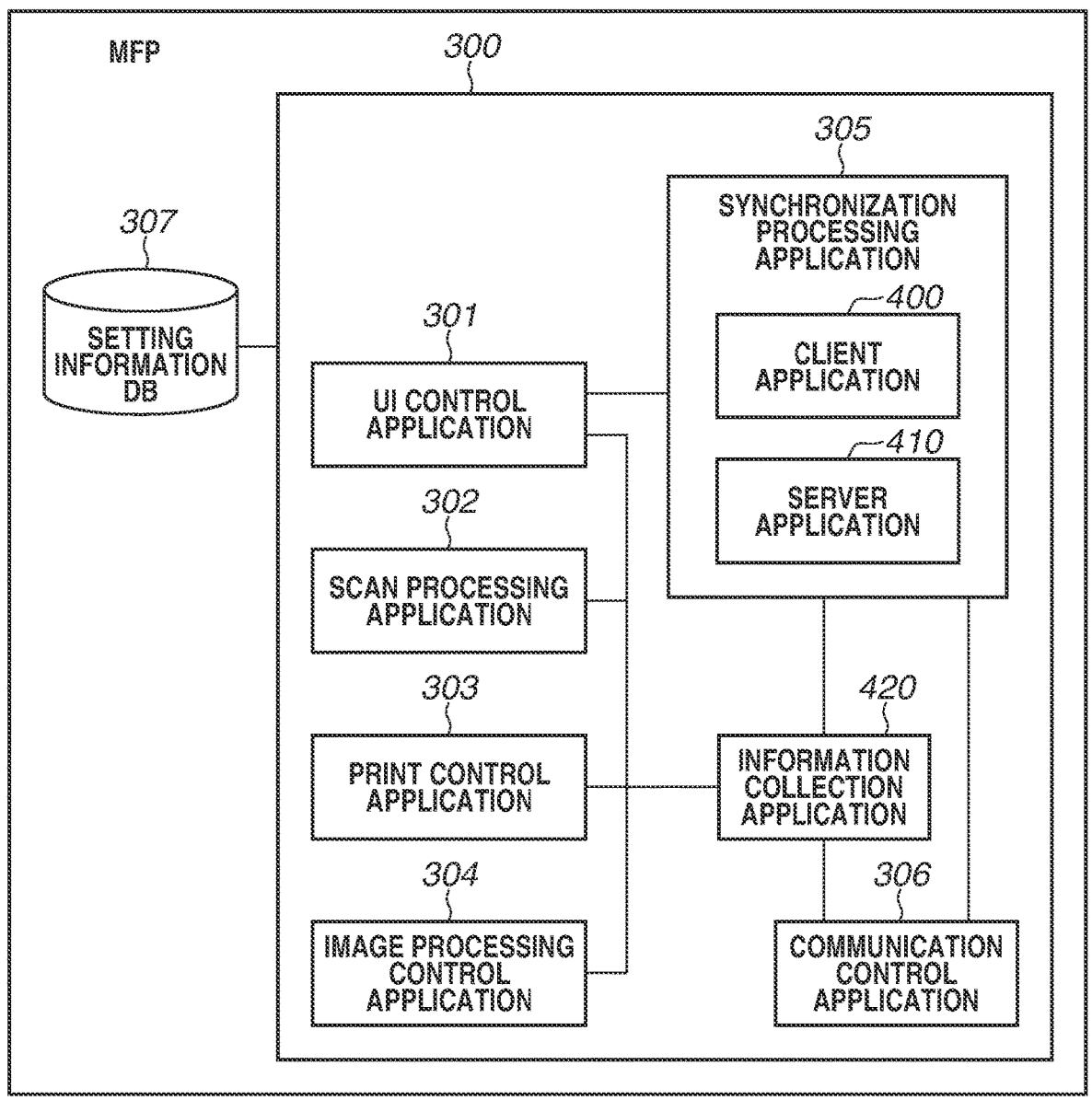
FIG. 3 illustrates a software configuration of the MFP.

FIG. 3 illustrates a software configuration of the MFP 110. As illustrated in FIG. 3, an MFP firmware 300 includes applications for controlling the operation of the MFP 110. Programs for each application are stored in an application storage unit such as the ROM 206 or the HDD 205. The CPU 202 reads out each application into the RAM 203 from the application storage unit, and executes the application. The MFP 110 may include a plurality of processors and some of the applications illustrated in FIG. 3 may be executed by a processor that is different from the CPU 202.

A synchronization processing application 305 is an application for synchronizing setting information of the synchronization server 120 with setting information of the MFP 110. The synchronization processing application 305 includes the client application 400 and a server application 410. The client application 400 is an application used for the MFP 110 to function as a client for the synchronization server 120. The server application 410 is an application used for the MFP 110 to function as the synchronization server 120. The client application 400 and the server application 410 will be described in detail below. An administrator of the MFP 110 can activate or deactivate the server application 410 by changing the setting information. When the server application 410 is activated, the MFP 110 functions as the synchronization server 120.

A UI control application 301 controls the operation unit I/F 201 and performs display control of a graphical UI to be displayed on the display unit 211 provided in the operation unit 210. A scan processing application 302 controls the device I/F 204 to control the operation of the scanner 212. A print control application 303 controls the device I/F 204 to control the operation of the printer 213. An image processing control application 304 controls the image processing unit 208 to perform image processing. A communication control application 306 controls the network I/F 207 to perform communication control.

The information collection application 420 is an application for collecting information generated in the other applications in the MFP firmware 300 and information generated in hardware controlled by each application, and transmitting the collected information to the maintenance server 130. The information collection application 420 will be described in detail below.

A setting information DB 307 is a database that manages setting information used for each of the applications described above to perform an operation. Examples of the setting information managed by the setting information DB 307 include setting value used when functions are executed, address book information customized for each user, and setting values indicating the arrangement of buttons on an operation screen, a display language, and the like. An area for the setting information DB 307 is secured in a storage unit such as the HDD 205.

Figure 4A:
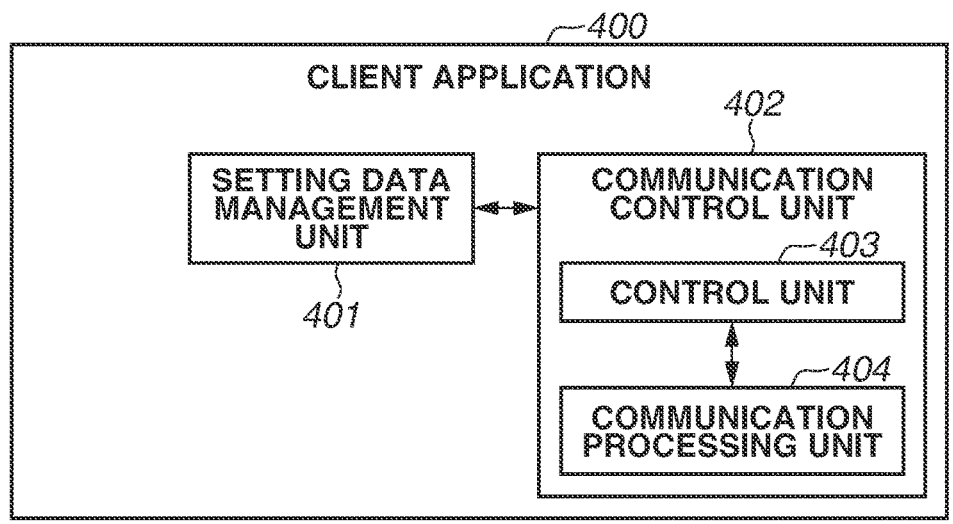
FIG. 4A illustrates a configuration of a client application.

The configuration of the client application 400 will be described with reference to FIG. 4A. FIG. 4A illustrates the configuration of the client application 400. The client application 400 includes a setting data management unit 401 and a communication control unit 402. The setting data management unit 401 executes processing, such as writing, reading, and deletion, on setting information held in the setting information DB 307 of the MFP 110. When update information about master data 415 is acquired from the synchronization server 120 under control of the communication control unit 402 to be described below, the setting data management unit 401 performs a control operation to reflect the acquired update information in the setting information DB 307. An update inquiry may be made by the MFP 110 during user log-in processing, or may be made at periodic time intervals. Further, when the setting information DB 307 is updated in the MFP 110, the setting data management unit 401 causes the communication control unit 402 to execute processing for reflecting update information indicating updated contents of the setting information DB 307 in the master data 415 stored in the synchronization server 120. If the communication with the synchronization server 120 to execute the communication control unit 402 is unsuccessful, the setting data management unit 401 sends a notification indicating that the synchronization communication is unsuccessful to the UI control application 301.

The communication control unit 402 controls the communication control application 306 to communicate with another apparatus. The communication control unit 402 controls the synchronization communication for synchronizing the setting information with the synchronization server 120. The communication control unit 402 includes a control unit 403 and a communication processing unit 404. The control unit 403 performs a control operation with respect to the synchronization processing for synchronizing setting values with the synchronization server 120. The control unit 403 receives the update information about the master data 415 that is acquired by the communication processing unit 404 from the synchronization server 120. The control unit 403 requests the setting data management unit 401 to reflect the received update information about the master data 415 in the setting information DB 307. The communication processing unit 404 controls communication processing via the communication I/F 207. The communication processing unit 404 executes communication processing between the synchronization server 120 and the MFP 110 in cooperation with a communication processing unit 414 to be described below.

Figure 4B:
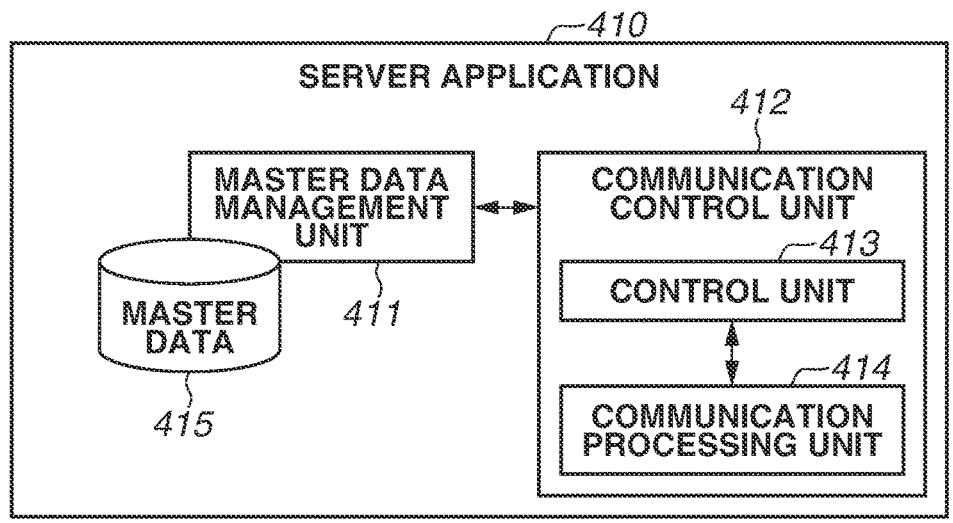
FIG. 4B illustrates a configuration of a server application.

Next, the configuration of the server application 410 will be described with reference to FIG. 4B. FIG. 4B illustrates the configuration of the server application 410. The server application 410 includes a master data management unit 411 and a communication control unit 412. The master data management unit 411 reads out the update information about the master data 415 or updates the master data 415 depending on the communication contents received by the communication control unit 412. The master data 415 stores the setting information about the MFP 110 with which the server application 410 communicates. The master data 415 is stored in the storage unit such as the HDD 205.

The communication control unit 412 controls communication processing via the network I/F 207. The communication control unit 412 includes a control unit 413 and the communication processing unit 414. The control unit 413 determines whether the communication contents received by the communication processing unit 414 indicate an update information acquisition request or an update request, and sends request to the master data management unit 411. When it is determined that the communication contents indicate the update information acquisition request, the control unit 413 acquires the update information from the master data management unit 411 and notifies the communication processing unit 414 of the update information. The communication processing unit 414 controls communication processing between the synchronization server 120 and the MFP 110 in cooperation with the communication processing unit 404 via the network I/F 207.

Table 1 illustrates settings to be synchronized between the client application 400 and the server application 410. In the client application 400, the settings illustrated in Table 1 are recorded on the setting information DB 307. In the server application 410, the synchronized settings received from the synchronized client application 400 are recorded on the master data 415. In the case of recording the settings on the master data 415, the recording method varies depending on the classification of settings. Device information and device settings are managed for each MFP 110, and thus are recorded for each device. An address book, user management setting, and user individual setting, which are commonly used among the plurality of MFPs 110, are recorded for each setting category. Since the user individual setting is managed for each user, the setting is recorded in setting items for each user.

TABLE 1

| Classification | Item |
| --- | --- |
| Device information | Device ID |
| | Device name |
| | Date/time setting |
| Device setting | Device setting |
| | Display setting |
| | Security setting |
| Address book | Common address book |
| User management setting | User management information |
| | Group management information |
| User individual setting | Device setting |
| | Display setting |
| | Simple setting |
| | Individual address book |

Figure 4C:
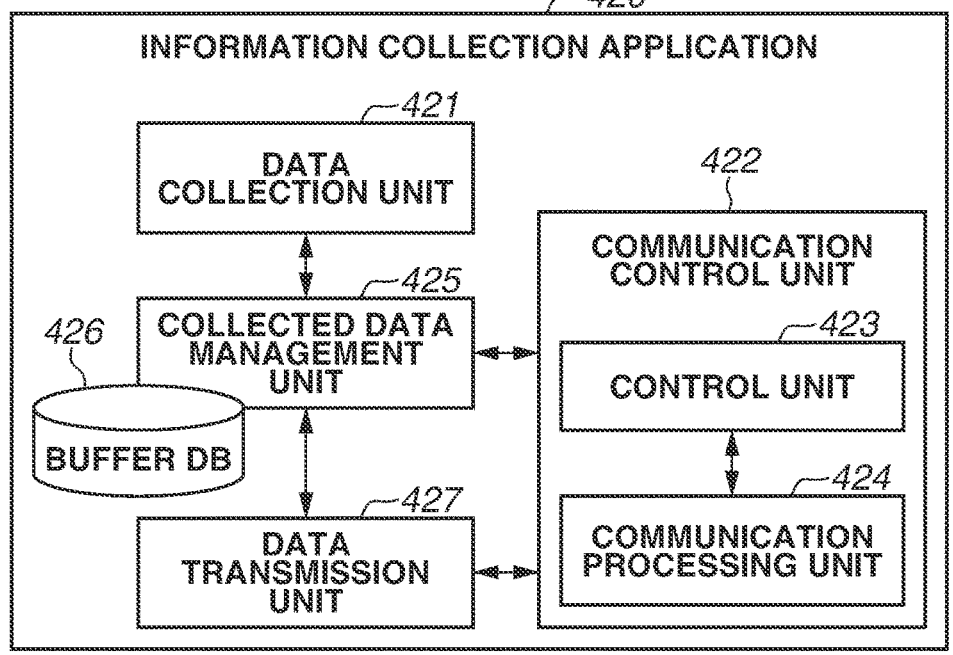
FIG. 4C illustrates a configuration of an information collection application.

Next, the configuration of the information collection application 420 will be described with reference to FIG. 4C. FIG. 4C illustrates the configuration of the information collection application 420. The information collection application 420 includes the data collection unit 421, the data transmission unit 427, a collected data management unit 425, and a communication control unit 422. The data collection unit 421 collects information to be collected from each application of the MFP 110, structures the collected information and the time when information is collected, and requests the collected data management unit 425 to record the information. The collected data management unit 425 executes processing for recording collected data in the buffer DB 426 and processing for reading out the data. In the case of recording the data in the buffer DB 426, the collected data management unit 425 sends, to the data transmission unit 427, a notification indicating that the buffer DB 426 is updated. The buffer DB 426 is stored in the storage unit such as the HDD 205.

The communication control unit 422 controls communication processing via a network I/F 257. The communication control unit 422 includes a control unit 423 and a communication processing unit 424. The control unit 423 controls the transmission of collected data to the maintenance server 130 and the reception of a data collection request from the maintenance server 130. The communication processing unit 424 executes communication processing between the maintenance server 130 and the MFP 110 in cooperation with a communication processing unit 508, which is described below, via the network I/F 257. The data transmission unit 427 reads out the contents recorded on the buffer DB 426 from the collected data management unit 425, and instructs the communication control unit 422 to transmit the data to the maintenance server 130.

Table 2 illustrates an example of information that is collected by the information collection application 420 and is transmitted to the maintenance server 130. The information collection application 420 operates to detect a timing when information is collected, collect the information about the corresponding item, and record the information in the buffer DB 426. Of information corresponding to items classified as configuration information, a device identification (ID) and a device name, which indicate information that is fixed for each MFP 110 and is not changed, is collected only when the MFP 110 is first connected to the maintenance server 130. Information corresponding to items classified as other configuration information (apparatus information), i.e., firmware, date/time setting, and Internet Protocol (IP) address, is collected when the version of firmware is upgraded, or when the setting is changed. Information corresponding to items classified as application, i.e., an application name, an application authority, and an application state indicating whether an application is being executed, is collected when an application to run on the MFP firmware 300 is installed, updated, or deleted. In the case of managing the version by individual applications, information about not only the application name, but also the version may be collected. As for items classified as a device state, the occurrence of an error or alarm in the MFP 110 is detected and information about the occurrence of the error or the alarm is collected when the error or the alarm has occurred in the MFP 110. A plurality of errors or alarms may occur concurrently. Accordingly, in the case of collecting information, information about all errors and alarms which have occurred in the MFP 110 is collected. If the operating state is restored from the state where the error or the alarm has occurred, the restoration is detected and information about the restoration from the state where the error or alarm has occurred is collected. As for items classified as a power supply state, information about a change in the state which has occurred during start-up, shut-down, or sleep is collected. As for items classified as job information, a job to be executed in the MFP 110 is detected and information indicating that the job is executed and setting information about the executed job are collected.

TABLE 2

List of Operation Information to be Collected

| Classification | Item | Information collection timing |
|---|---|---|
| Configuration Information | Device ID Device name Firmware | During initial connection During version change |
| | Date/time setting IP address | During setting change |
| Application | Application name Application Authority Application state | During update of application |

TABLE 2-continued

List of Operation Information to be Collected

| Classification | Item | Information collection timing |
|---|---|---|
| Device state | Error | During occurrence of error |
| | Alarm | During alert change |
| | Restoration | During restoration |
| Power supply state | Standby Power-off Sleep | During start-up During shut-down During sleep |
| Job | Job execution Job setting | During execution of job |

<Maintenance Server>

Figure 2B:
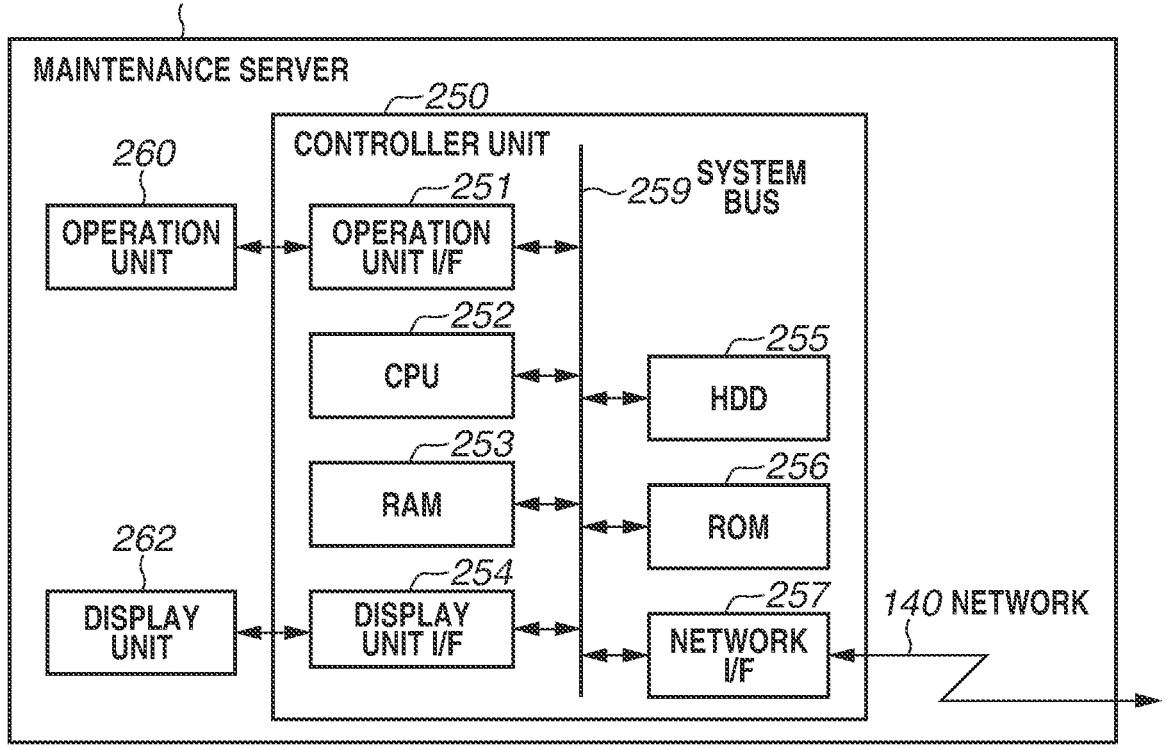
FIG. 2B illustrates a hardware configuration of a maintenance server.

FIG. 2B illustrates a hardware configuration of the maintenance server 130. The maintenance server 130 includes a controller unit 250, an operation unit 260, and a display unit 262. The operation unit 260 is an input device such as a pointing device or a keyboard. The display unit 262 is an output device such as a display. The controller unit 250 includes a CPU 252, a RAM 253, a display unit I/F 254, a hard disk drive (HDD) 255, a ROM 256, and the network I/F 257. The CPU 252, the RAM 253, the display unit I/F 254, the HDD 255, the ROM 256, and the network I/F 257 are communicably connected via a system bus 259. The CPU 252 activates the OS using a boot program stored in the ROM 256. Further, the CPU 252 executes application programs (hereinafter referred to as applications) stored in the HDD 255 on the OS, which executes various processes. The RAM 253 is used as a working memory for the CPU 252. The HDD 255 stores applications, master data, and the like. A method for managing the master data will be described below. An operation unit I/F 251 is an interface for connecting with the operation unit 260, and transmits information input from the user through the operation unit 260 to the CPU 252. The display unit I/F 254 outputs screen data to be displayed on the display unit 262 to the display unit 262. The network I/F 257 transmits and receives data to and from each apparatus on the network 140.

Figure 5:
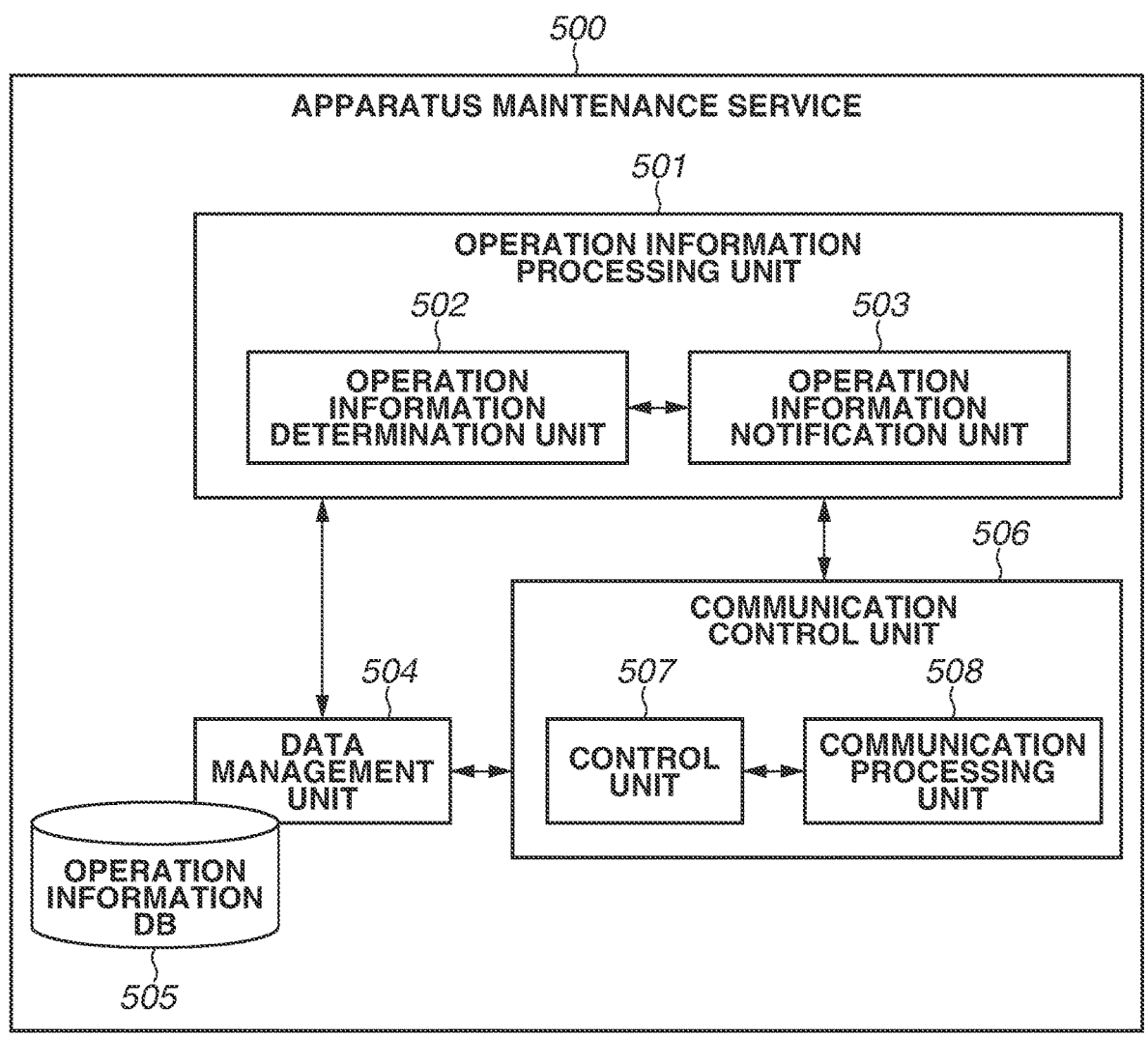
FIG. 5 illustrates a software configuration of an apparatus maintenance service.

FIG. 5 illustrates a software configuration of an apparatus maintenance service. The apparatus maintenance service 500 is an application for controlling the operation of the maintenance server 130, and is stored in the application storage unit such as the ROM 256 or the HDD 255. The CPU 252 reads out a program into the RAM 253, from the application storage unit, executing the apparatus maintenance service 500. The apparatus maintenance service 500 provides a function for collecting information about the MFP 110 from the MFP 110, determining the necessity of maintenance, and managing the information.

The apparatus maintenance service 500 includes an operation information processing unit 501, a data management unit 504, and a communication control unit 506. The operation information processing unit 501 uses the information stored in an operation information DB 505 to determine the collect target operation information about the MFP 110 and to send a notification indicating the operation information. The operation information processing unit 501 includes an operation information determination unit 502 and an operation information notification unit 503. When the data management unit 504 records information in the operation information DB 505, the operation information determination unit 502 determines the operating state of the MFP 110 based on the recorded information. Further, the operation information determination unit 502 notifies the data management unit 504 of the determination result about the operating state, records information about the determination result in the operation information DB 505, and notifies the operation information notification unit 503 of the recorded information. Upon receiving the notification indicating the operating state from the operation information determination unit 502, the operation information notification unit 503 sends a notification indicating the operating state of the MFP 110. In this case, the notification indicating the operating state of the MFP 110 may be displayed on the display unit 262 of the maintenance server 130, or may be sent to the administrator of the MFP 110 by electronic mail. Further, the notification indicating the operating state of the MFP 110 that is determined by the apparatus maintenance service 500 may be sent to the MFP 110. The data management unit 504 performs processing for reflecting the information received by the communication control unit 506 from the information collection application 420 and the notification indicating the operation information sent from the operation information determination unit 502, in the operation information DB 505. The information collected from all MFPs 110 which communicates with the maintenance server 130 is recorded in the operation information DB 505. The operation information DB 505 is stored in the storage unit such as the HDD 255. With respect to the information to be recorded in the operation information DB 505, all the pieces of information are recorded and the latest operation information about each MFP 110 is recorded. In this case, the operation information to be recorded for each MFP 110 is classified into "configuration information", "application", "device information", and "power supply state" as illustrated in Table 2. The communication control unit 506 controls communication processing via the network I/F 257. The communication control unit 506 includes a control unit 507 and the communication processing unit 508. The control unit 507 controls collected data to be communicated with the information collection application 420. The communication processing unit 508 controls communication processing via the network I/F 257, and executes communication processing between the maintenance server 130 and the MFP 110 in cooperation with the communication processing unit 424 described above.

<Synchronization Processing (Client)>

Figure 6:
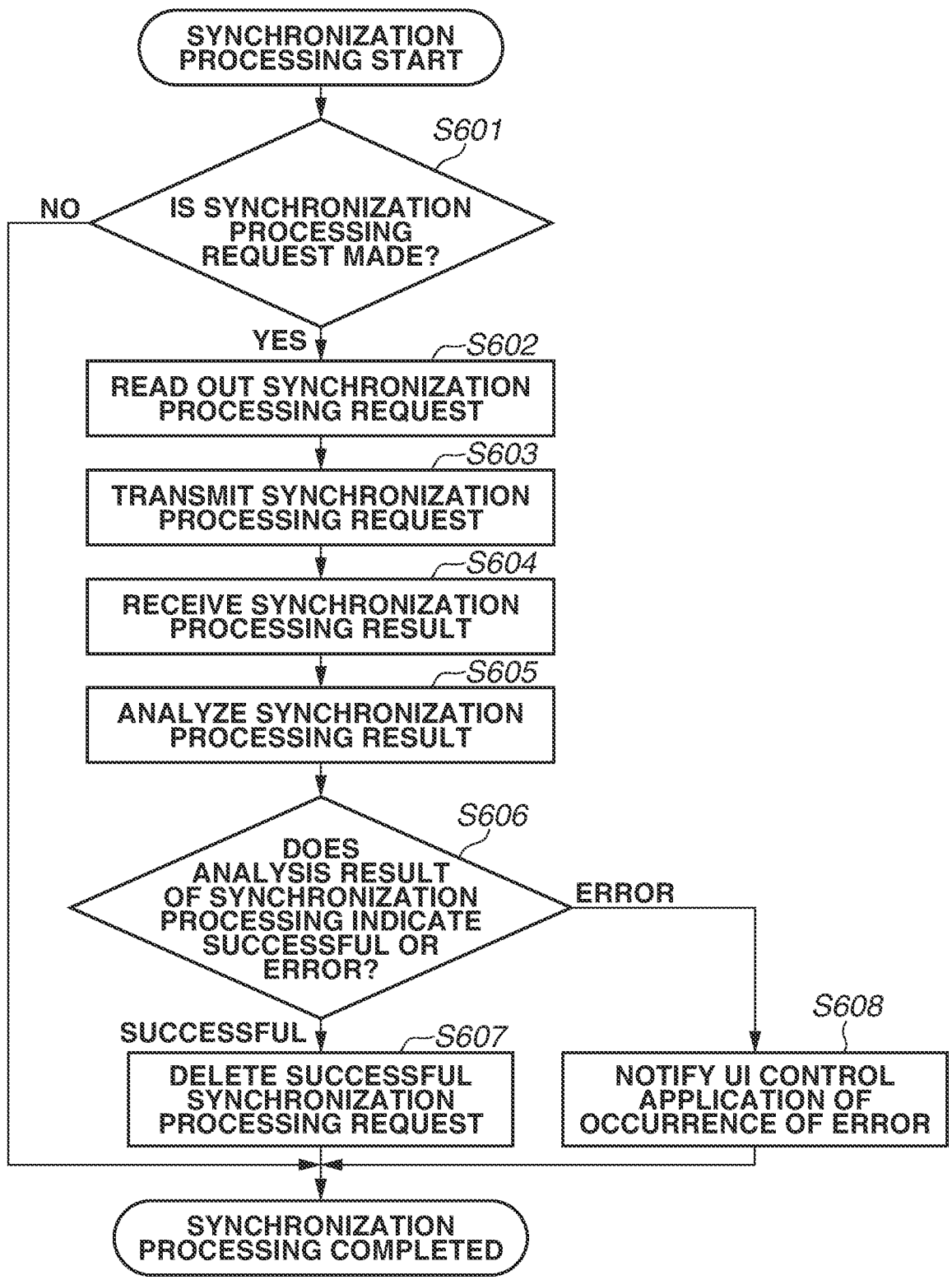
FIG. 6 is a flowchart illustrating synchronization processing to be performed by the client application.

A flow of processing to be performed by the client application 400 of the synchronization processing application 305 will be described. FIG. 6 is a flowchart illustrating synchronization processing to be performed by the client application 400. Each step in the flowchart illustrated in FIG. 6 is performed in such a manner that the CPU 202 included in the MFP 110 loads a program stored in the storage unit, such as the HDD 205 or the ROM 206, into the RAM 203, and executes the loaded program.

When the client application 400 is activated, in step S601, the setting data management unit 401 determines whether a synchronization processing request is made. If the synchronization processing request is made (YES in step S601), the processing proceeds to step S602. If the synchronization processing request is not made (NO in step S601), the processing in the flowchart is terminated.

In step S602, the setting data management unit 401 reads out the synchronization processing request, and then the processing proceeds to step S603.

In step S603, the setting data management unit 401 notifies the communication control unit 402 of the read synchronization processing request. The communication control unit 402 transmits the synchronization processing request to the synchronization server 120 through the communication processing unit 404, and then the processing proceeds to step S604.

In step S604, the communication control unit 402 receives the synchronization processing result through the communication processing unit 404, and then the processing proceeds to step S605. In this case, if the communication cannot be normally established using the processing in which the communication processing unit 404 transmits the synchronization processing request to the synchronization server 120 in step S603, an error is received as the synchronization processing result.

In step S605, the communication control unit 402 notifies the setting data management unit 401 of the received synchronization processing result. The setting data management unit 401 analyzes the synchronization processing result and identifies the processing result of the transmitted synchronization processing request, and then the processing proceeds to step S606. For example, if the synchronization processing result has timed out and setting information cannot be synchronized, the setting data management unit 401 determines that an error has occurred.

In step S606, if the identified synchronization processing result indicates successful, the processing proceeds to step S607. If the synchronization processing result indicates an error, the processing proceeds to step S608.

In step S607, the setting data management unit 401 deletes the synchronization processing request in response to which the synchronization processing is successfully executed, and then this flowchart ends. In this case, if a notification indicating that the synchronization processing is unsuccessful is sent to the UI control application 301, the setting data management unit 401 sends a request to withdraw the notification indicating that the synchronization processing is unsuccessful, and then this flowchart ends.

In step S608, the setting data management unit 401 sends a synchronization processing failure notification indicating that the synchronization processing is unsuccessful to the UI control application 301. The UI control application 301 receives the synchronization processing failure notification and displays information indicating that the synchronization processing is unsuccessful on the display unit 211. Further, the setting data management unit 401 notifies the information collection application 420 of the contents of the failed synchronization processing. In this case, the setting data management unit 401 records, as the information indicating that the synchronization processing is unsuccessful, the individual number of the communication destination MFP 110b, the IP address and host name to be used for communication, and the processing result of the synchronization processing request analyzed in step S605. Further, the setting data management unit 401 registers information to instruct re-execution of the processing flow when a predetermined period has lapsed, and then this flowchart ends.

The processing described above enables the MFP 110 to perform synchronization processing for synchronizing the setting information with the synchronization server 120. By this processing, when the setting information in the MFP 110 serving as a client is updated, the updated contents are reflected in the master data 415, and thus newer updated contents are reflected in the master data 415. The MFP 110 serving as the client acquires update information indicating the updated contents of the master data 415, so that the updated contents indicated by the setting information generated in another MFP 110 can be reflected in the settings of the apparatus. Thus, the MFP 110 can synchronize the common setting information.

<Synchronization Processing (Server)>

Figure 7:
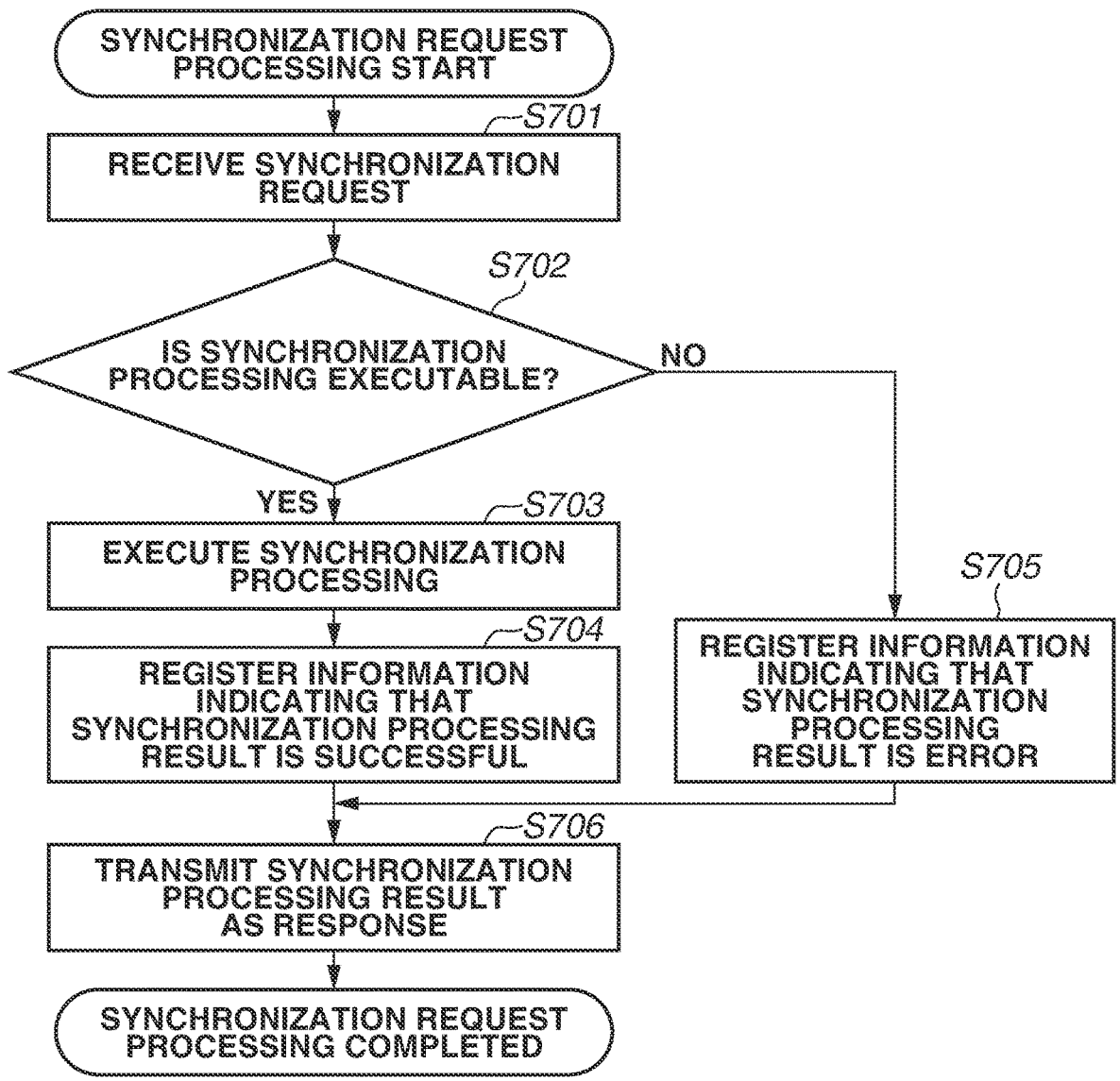
FIG. 7 is a flowchart illustrating synchronization processing to be performed by the server application.

A flow of processing to be performed by the server application 410 of the synchronization processing application 305 will be described. FIG. 7 is a flowchart illustrating the synchronization processing to be performed by the server application 410. Each step in the flowchart illustrated in FIG. 7 is performed in such a manner that the CPU 202 included in the MFP 110 loads a program stored in the storage unit, such as the HDD 205 or the ROM 206, into the RAM 203, and executes the loaded program.

When the server application 410 is activated, in step S701, the communication processing unit 414 receives a synchronization processing request from the communication processing unit 404 in the client application 400. Further, the communication processing unit 414 sends a notification indicating that the synchronization processing request is received, to the control unit 413, and then the processing proceeds to step S702.

In step S702, the control unit 413 makes an inquiry to the master data management unit 411 about whether the synchronization processing is executable. If the result of the inquiry made to the master data management unit 411 indicates that the synchronization processing is executable (YES in step S702), the control unit 413 sends a synchronization request to the master data management unit 411, and then the processing proceeds to step S703. If the result of the inquiry made to the master data management unit 411 indicates that the synchronization processing is not executable (NO in step S702), the processing proceeds to step S705.

In step S703, the master data management unit 411 identifies data to be updated from the information included in the received synchronization request, and updates the data. Further, the master data management unit 411 updates the data update time with the reception time included in the synchronization request. After the master data management unit 411 terminates the data update processing, the processing proceeds to step S704.

In step S704, the master data management unit 411 sends a notification indicating that the processing result of the synchronization processing is successful, to the control unit 413. The control unit 413 records information indicating that the result of the synchronization processing is successful as a response to the synchronization processing request, and notifies the communication processing unit 414 of the response to the synchronization processing request. Then, the processing proceeds to step S706.

In step S705, the control unit 413 records, as synchronization request response information, the information indicating that the result of the synchronization processing is unsuccessful and the information indicating that the synchronization processing from the master data management unit 411 is not executable. The control unit 413 notifies the communication processing unit 414 of the response to the synchronization request, and then the processing proceeds to step S706.

In step S706, the communication processing unit 414 transmits the synchronization processing result to the MFP 110 as the response to the request received in step S701, and then this flowchart ends.

In the processing described above, the synchronization server 120 can reflect the synchronization processing result in the master data 415. Thus, the server application 410 can control updating of the master data 415 and the synchronization processing request from the MFP 110.

<Information Collection Processing>

Figure 8:
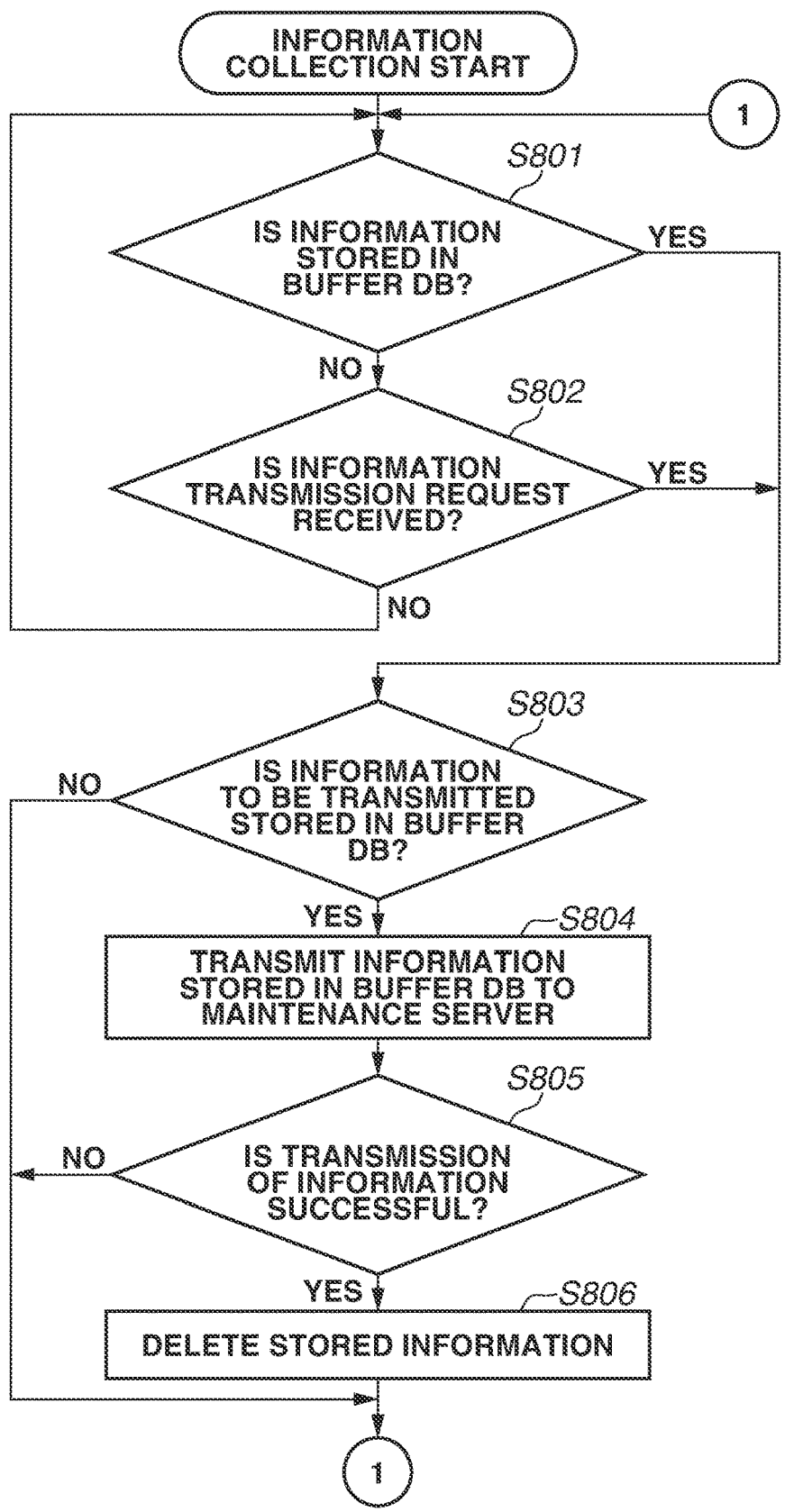
FIG. 8 is a flowchart illustrating collected data transmission processing to be performed by the information collection application.

Next, a processing procedure for the information collection application 420 of the MFP 110 will be described. FIG. 8 is a flowchart illustrating collected data transmission processing to be performed by the information collection application 420. The flowchart is implemented in such a manner that the CPU 202 loads a program stored in the ROM 206 or the HDD 205 into the RAM 203, and executes the loaded program.

The information collection application 420 is constantly operating when the MFP 110 is operating. The data collection unit 421 monitors whether information to be collected is generated during the operation of each application of the MFP 110, and the information is stored in the buffer DB 426 at a timing when the information is generated. The information collection application 420 transmits the information stored in the buffer DB 426 to the maintenance server 130 when the buffer DB 426 is updated and when a request for transmitting information is received from the maintenance server 130. The processing is started in a state where the collected data management unit 425 monitors whether a notification indicating that information is stored in the buffer DB 426, or an information transmission request from the maintenance server 130 is generated.

When the information collection application 420 is activated, in step S801, the collected data management unit 425 checks whether an information storage notification is sent from the data collection unit 421 to the buffer DB 426. If the information storage notification is not received (NO in step S801), the processing proceeds to step S802. If the information storage notification is received (YES in step S801), the processing proceeds to step S803.

In step S802, the collected data management unit 425 checks whether there is a notification indicating that the communication control unit 422 has received the information transmission request from the maintenance server 130. If the information transmission request is not received (NO in step S802), the processing returns to step S801. If the information transmission request is received (YES in step S802), the processing proceeds to step S803.

In step S803, the collected data management unit 425 checks whether information to be transmitted to the maintenance server 130 is stored in the buffer DB 426. If information to be transmitted is stored in the buffer DB 426 (YES in step S803), a notification indicating that information to be transmitted is stored in the buffer DB 426 is sent to the data transmission unit 427, and then the processing proceeds to step S804. If information to be transmitted is not stored in the buffer DB 426 (NO in step S803), the processing returns to step S801.

In step S804, the data transmission unit 427 acquires, from the collected data management unit 425, the information stored in the buffer DB 426 as checked in step S803. Further, the data transmission unit 427 designates the maintenance server 130 as a transmission destination and sends an information transmission request to the communication control unit 422. The communication control unit 422 executes communication with the maintenance server 130 and returns the execution result to the data transmission unit 427, and then the processing proceeds to step S805.

In step S805, the data transmission unit 427 determines whether the execution result of the communication processing received from the communication control unit 422 indicates successful. If the communication processing is successful (YES in step S805), the processing proceeds to step S806. If the communication processing is unsuccessful (NO in step S805), the processing returns to step S801.

In step S806, the data transmission unit 427 instructs the collected data management unit 425 to delete the information transmitted in step S804 from the buffer DB 426. The collected data management unit 425 deletes the information transmitted to the maintenance server 130, which has received the instruction from the data transmission unit 427, from the buffer DB 426. After completion of the deletion of the information from the buffer DB 426, the processing returns to step S801.

In the processing described above, information can be transmitted from the information collection application 420 to the maintenance server 130 at a timing when the information is stored in the buffer DB 426, or when the information transmission request is received from the maintenance server 130.

<Operating State Update Processing>

Figure 9:
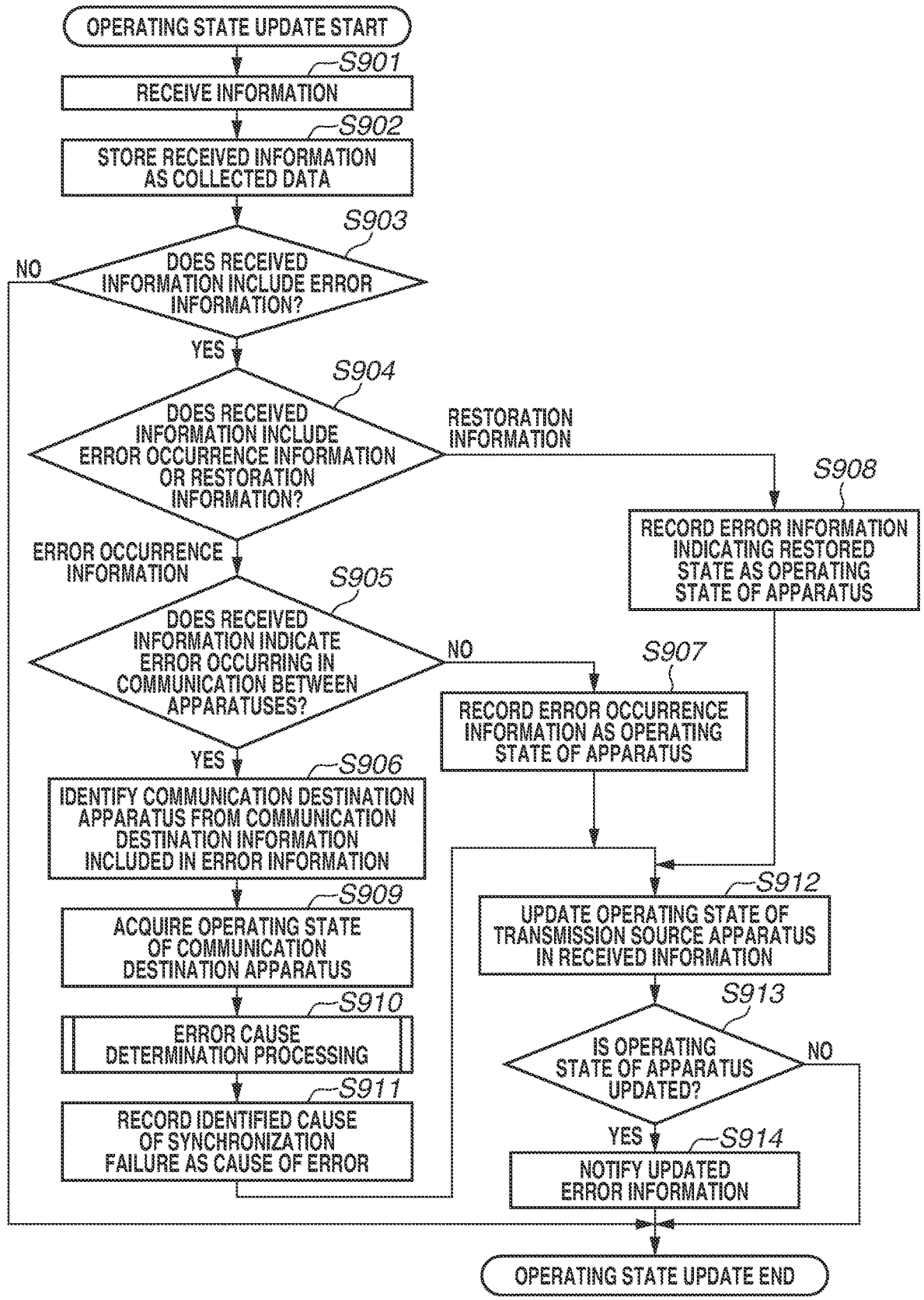
FIG. 9 is a flowchart illustrating operating state update processing to be performed by the apparatus maintenance service.

Next, a processing procedure for the apparatus maintenance service 500 of the maintenance server 130 will be described. FIG. 9 is a flowchart illustrating operating state update processing to be performed by the apparatus maintenance service 500. This flowchart is implemented in such a manner that the CPU 252 loads a program stored in the ROM 256 or the HDD 255 into the RAM 253, and executes the loaded program.

When the apparatus maintenance service 500 is activated, in step S901, the communication control unit 506 receives information from the information collection application 420. The communication control unit 506 notifies the data management unit 504 of the received information, and then the processing proceeds to step S902.

In step S902, the data management unit 504 stores the information received in step S901 in the operation information DB 505. Further, the data management unit 504 notifies the operation information determination unit 502 of the stored information, and then the processing proceeds to step S903.

In step S903, the operation information determination unit 502 determines whether the information received in step S902 includes error information. In order to determine whether the received information includes error information, it is checked whether data indicating an attribute about the error information is included in the received information. If the operation information determination unit 502 determines that the received information includes error information (YES in step S903), the processing proceeds to step S904. If the operation information determination unit 502 determines that the received information does not include error information (NO in step S903), this flowchart ends.

In step S904, the operation information determination unit 502 determines whether the error information received in step S902 is information indicating an occurrence of an error, or information indicating a restoration from the error. In this determination, it is checked whether a state attribute included in detailed information of the error information is a value representing the occurrence of an error, or a value representing the restoration from the error. By step S902, if the received information is information indicating the occurrence of an error, the processing proceeds to step S905, whereas if the received information is information indicating the restoration from the error, the processing proceeds to step S908.

In step S905, the operation information determination unit 502 determines whether the error information received in step S902 indicates the error that has occurred in the function for performing communication between apparatuses. Examples of the function for performing communication between apparatuses include a function for synchronizing setting information with the synchronization server 120 in the client application 400 of the MFP 110. If the error has occurred in the function for performing communication between apparatuses (YES in step S905), the processing proceeds to step S906. If the error has occurred in a single apparatus other than the function for performing communication between apparatuses (NO in step S905), the processing proceeds to step S907.

In step S906, the operation information determination unit 502 acquires information that can identify the communication destination apparatus and is included in the error detail information in the information received in step S902. In this case, the error that has occurred in the communication between apparatuses includes the IP address and host name, which indicate a communication destination MFP, as information capable of identifying the communication destination apparatus, and a device serial number with which the communication destination MFP can be uniquely identified. The operation information determination unit 502 identifies information for identifying the communication destination apparatus, and then the processing proceeds to step S909.

In step S907, the operation information determination unit 502 determines the latest operating state of the apparatus, which has transmitted the information, based on the error information included in the information obtained in step S902. Further, the operation information determination unit 502 requests the data management unit 504 to record the recorded contents in the operation information DB 505, and then the processing proceeds to step S912.

In step S908, the operation information determination unit 502 determines the latest operating state of the apparatus, which has transmitted the information, as a restored state, based on the error information which indicates the restored state and is included in the information obtained in step S902. The operation information determination unit 502 requests the data management unit 504 to record the recorded contents in the operation information DB 505, and then the processing proceeds to step S912.

In step S909, the operation information determination unit 502 identifies the communication destination apparatus by using the information obtained in step S906, and acquires the operating state of the identified communication destination apparatus from the data management unit 504. After the operation information determination unit 502 acquires the operating state of the identified communication destination, the processing proceeds to step S910.

In step S910, the operation information determination unit 502 performs error cause determination processing for determining the cause of the error, which has occurred in the communication between apparatuses, based on the information received in step S902 and the operation information obtained in step S907. The error cause determination processing will be described in detail with reference to FIG. 10. After completion of the error cause determination processing, the processing proceeds to step S911.

In step S911, the operation information determination unit 502 registers information recorded as the cause of the error determined by step S910 in the data management unit 504, and then the processing proceeds to step S912.

In step S912, the data management unit 504 updates the operation information DB 505 so as to match it with the apparatus operating state received from the operation information determination unit 502, and then the processing proceeds to step S913.

In step S913, the data management unit 504 determines whether the apparatus operating state is changed by updating the operation information DB 505 in step S912. If the apparatus operating state is changed (YES in step S913), a notification indicating an error type and an error state is sent to the operation information notification unit 503 as changed contents of the operating state, and the processing proceeds to step S914. If the apparatus operating state is not updated (NO in step S913), the flowchart ends.

In step S914, the operation information notification unit 503 sends a notification indicating that a specific error type has been changed to the error state based on the changed contents received in step S913 as the operating state of the apparatus. For example, as for a printer error item, which is one of the error types, if a notification indicating a change from "error" to "restoration" is received, the operating state of the apparatus is sent as the notification indicating the restoration from the printer error.

In the processing described above, the maintenance server 130 can determine the operating state of the MFP 110 based on the information transmitted from the information collection application 420, and send a notification indicating that the operating state is updated if the operating state is updated with the error information.

In the error cause determination processing (step S910) executed by the operation information determination unit 502 of the apparatus maintenance service 500, the cause of the error is determined based on the error details included in the received error information and the operation information about the communication destination apparatus. Table 3 illustrates conditions based on which the determination is made.

operation information determination unit 502 determines whether the operating state of the communication destination has been acquired. If the operating state of the communication destination apparatus has been acquired (YES in step S1001), the processing proceeds to step S1002. If the operating state of the communication destination has not been acquired (NO in step S1001), the processing proceeds to step S1003.

In step S1002, the operation information determination unit 502 determines whether the apparatus is operating normally based on the operating state of the communication destination apparatus. The determination as to whether the apparatus is operating normally is made based on information about an activation state of the apparatus and information about an error occurrence state of the apparatus. If it is determined that the apparatus is operating normally (YES in step S1002), the processing proceeds to step S1004. If it is not determined that the apparatus is operating normally (NO in step S1002), the processing proceeds to step S1005.

Since the operation information about the communication destination apparatus cannot be acquired, in step S1003, the operation information determination unit 502 determines that the error has occurred in the communication between apparatuses due to the designation of an invalid communication destination apparatus. The operation information determination unit 502 records the determination result as the error cause, and the flowchart ends.

In step S1004, the operation information determination unit 502 determines, based on the operating state of the

TABLE 3

Error Cause Determination Condition Table

| | Conditions | |
|---|---|---|
| Error details | Operation information about communication destination apparatus | Error cause determination result |
| Communication error | There is no operation information | Invalid communication destination is designated |
| Communication error | Power supply state is power-off | Communication destination is not activated |
| Communication error | Device state is error | Error has occurred in communication destination |
| Communication error | Operation information is last updated out of range of predetermined period | Problem has occurred in operation of communication destination |
| Communication error | Synchronization server is not operating | Synchronization server is not operating in communication destination |
| Communication error | Operating state is normal | Problem has occurred in communicating environment with communication destination |
| Function inexecutable | Job execution information remains | Resource shortage has occurred due to execution of job in communication destination |
| Function inexecutable | Operating state is normal and there is no job information | Upper limit of the number of simultaneous synchronizations in communication destination is exceeded |

<Error Cause Determination Processing>

Figure 10:
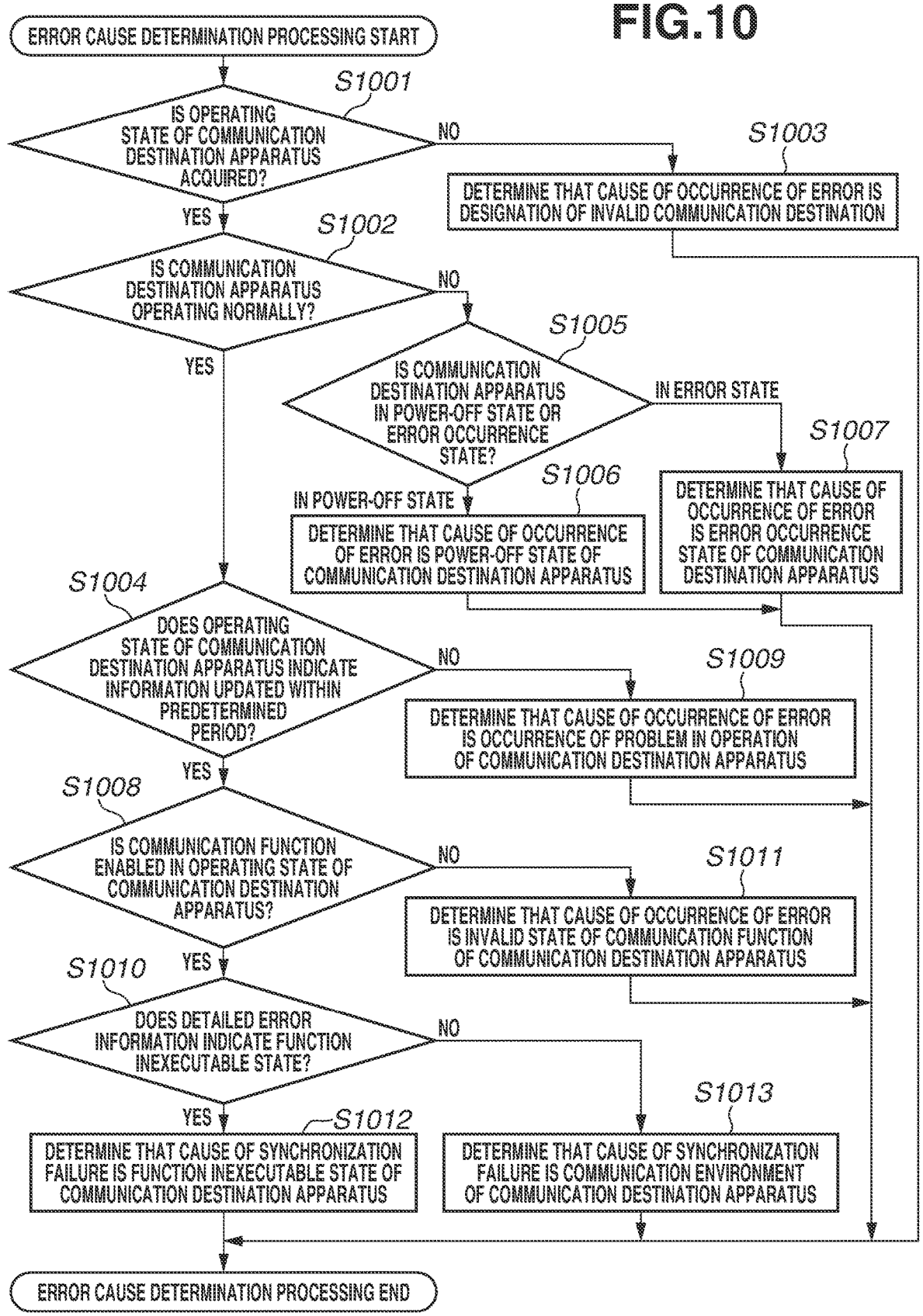
FIG. 10 is a flowchart illustrating error cause determination processing to be performed by the apparatus maintenance service.

FIG. 10 is a flowchart illustrating the error cause determination processing to be performed by the apparatus maintenance service 500. This processing relates to processing for determining the cause of a communication error when the information received by the apparatus maintenance service 500 from the information collection application 420 indicates a communication error in communication between apparatuses. In the error cause determination processing, the determination is made based on conditions illustrated in Table 3. This flowchart is implemented in such a manner that the CPU 252 loads a program stored in the ROM 256 or the HDD 255 into the RAM 253, and executes the loaded program.

In performing the error cause determination processing in the apparatus maintenance service 500, in step S1001, the communication destination apparatus, whether the information indicating the operating state is last updated within a predetermined period. In the information collection application 420, the information is periodically updated on the basis of an event in the apparatus. Accordingly, when the MFP 110 is operating normally, transmission of collected data occurs within a predetermined period. Thus, it is determined whether the information is updated within the predetermined period. If it is determined that the information is updated within the predetermined period (YES in step S1004), the processing proceeds to step S1008. If it is determined that the information is not updated within the predetermined period (NO in step S1004), the processing proceeds to step S1009.

In step S1005, the operation information determination unit 502 checks the apparatus state so as to identify the cause of the error in the apparatus which is not operating normally. If the operation information determination unit 502 determines that the apparatus is in the power-off state, the processing proceeds to step S1006. If the operation information determination unit 502 determines that the apparatus is in the error occurrence state, the processing proceeds to step S1007.

In step S1006, the operation information determination unit 502 determines that the error has occurred in the communication between apparatuses due to the power-off state of the communication destination MFP. The operation information determination unit 502 records the determination result as the error cause, and the flowchart ends.

In step S1007, the operation information determination unit 502 determines that the error has occurred in the communication between apparatuses due to the occurrence of an error in the communication destination apparatus (an error is occurring). The operation information determination unit 502 records the determination result as the error cause, and the flowchart ends.

In step S1008, the operation information determination unit 502 determines whether the synchronization server 120 is operating based on the operating state information about the communication destination apparatus. If the operation information determination unit 502 determines that the synchronization server 120 is operating (YES in step S1008), the processing proceeds to step S1010. If the operation information determination unit 502 does not determine that the synchronization server 120 is normally operating (NO in step S1008), the processing proceeds to step S1011.

In step S1009, the operation information determination unit 502 determines that the error has occurred in the communication between apparatuses due to the occurrence of a problem in the operation of the communication destination MFP. The operation information determination unit 502 records the determination result as the error cause, and the flowchart ends.

In step S1010, the operation information determination unit 502 reads out error detail information as the communication result from the error detail information included in the information received in step S902. Then, the operation information determination unit 502 determines whether the synchronization function is in an inexecutable state in the synchronization server 120 based on the error detail information as the communication result. The determination as to whether the synchronization function is in the inexecutable state in the synchronization server 120 is made based on the operating state of the synchronization server 120 at the synchronization timing. For example, in a state where communication resources are depleted in the synchronization server 120, it is difficult to communicate with the MFP 110*a*, and thus it can be said that the synchronization function is in the inexecutable state. Further, for example, when the RAM 203 has no free space in the synchronization server 120, or when the free space of the HDD 205 is depleted, it is difficult to perform the synchronization processing normally, and thus it can be said that the synchronization function is in the inexecutable state. This state can occur when a certain job to be executed in preference to the synchronization processing is being executed in the synchronization server 120. Specifically, if a certain job is being executed in the synchronization server 120 and resources are insufficient, an error occurs in the communication between the synchronization server 120 and the MFP 110*a* and a job execution history is recorded in the maintenance server 130 as the latest operating state information about the synchronization server 120. Accordingly, the operation information determination unit 502 which has checked the job execution history with respect to the latest operating state information about the synchronization server 120 determines that the error has occurred in the communication between apparatuses due to the function inexecutable state of the synchronization server 120 (YES in step S1010), and the processing proceeds to step S1012. On the other hand, if it is determined that the error has occurred in the communication between apparatuses due to a factor other than the function inexecutable state (NO in step S1010), the processing proceeds to step S1013.

Since the synchronization server 120 is not operating in the communication destination MFP, the operation information determination unit 502 determines, in step S1011, that the error has occurred in the communication between apparatuses due to the invalid state of the synchronization server 120 in the communication destination MFP. The operation information determination unit 502 records the determination result as the error cause, and the flowchart ends.

Since the detailed information of the communication function error information includes information indicating the function inexecutable state, in step S1012, the operation information determination unit 502 determines that the error has occurred in the communication between apparatuses due to the function inexecutable state in the communication destination MFP. The operation information determination unit 502 records the determination result as the error cause, and the flowchart ends.

Since the cause of the error cannot be identified from the information that can be acquired from the communication destination MFP, in step S1013, the operation information determination unit 502 determines that the error has occurred due to the communication environment between the communication destination MFP and the communication source MFP. The operation information determination unit 502 records the determination result as the error cause, and the flowchart ends.

In the processing described above, the apparatus maintenance service 500 can identify the cause of a failure in a case where the client application 400 of the MFP in which the information collection application 420 is operating, has failed in establishing a communication with the server application 410.

<Error Notification Screen>

Figure 11A:
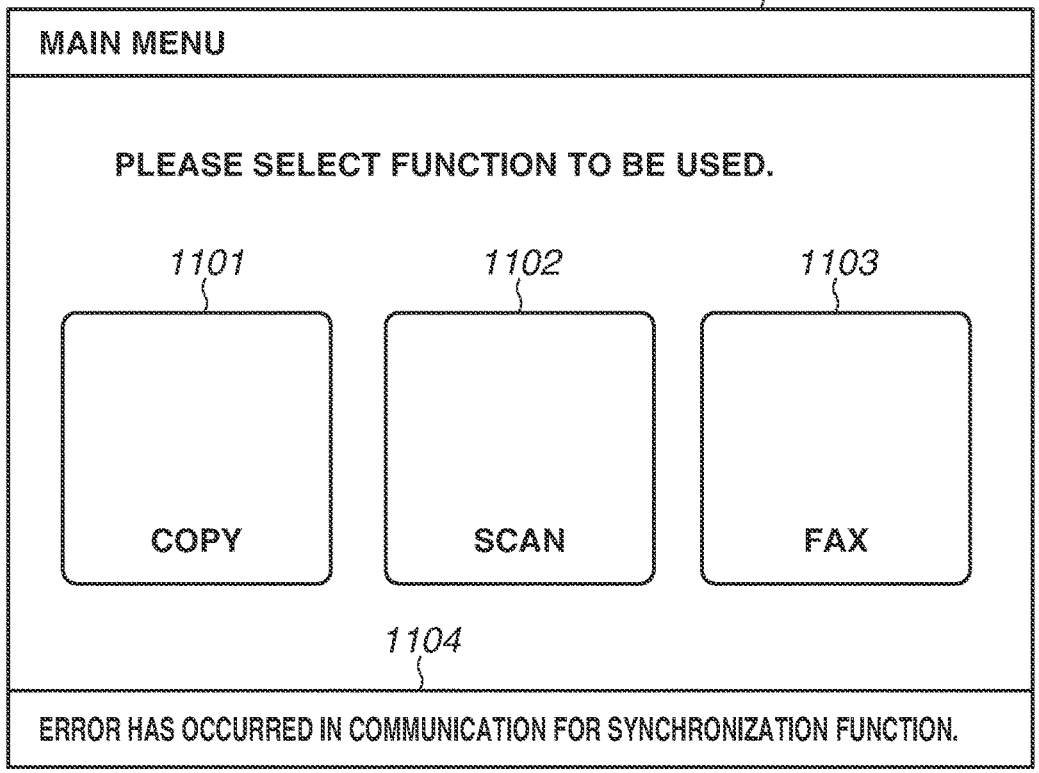
FIG. 11A illustrates an operation screen to be displayed on the MFP when a communication error occurs.

FIG. 11A illustrates an operation screen to be displayed on the MFP when a communication error has occurred.

Buttons 1101, 1102, and 1103 on a main menu screen 1100 are software buttons for instructing transition to an operation screen for executing functions of each MFP. When an operator performs a pressing operation on a software button, the operation unit 210 which has received the operation sends a notification indicating that the button is pressed, to the CPU 202 through the operation unit I/F 201. This pressing operation is recognized by the UI control application 301. After recognizing that the button is pressed, the UI control application 301 activates the corresponding application, and then transitions to the screen for each application. A state notification unit 1104 is an area for notifying the operator of the state of the MFP 110*a*. If the UI control application 301 receives information indicating that an error has occurred in step S608, a message indicating that "Error has occurred in communication for synchronization function." is displayed.

Figure 11B:
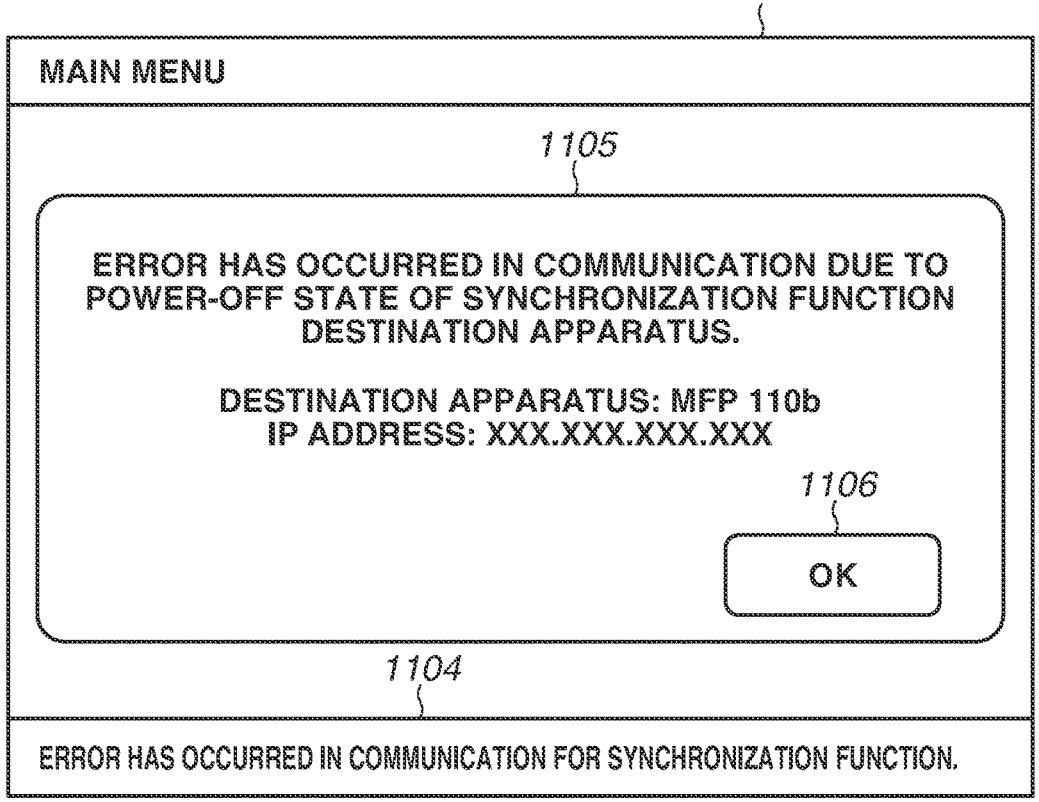
FIG. 11B illustrates an error cause notification screen to be displayed on the MFP when a communication error occurs.

FIG. 11B illustrates an error cause notification screen to be displayed on the MFP when the communication error has occurred. On the main menu screen 1100, an error cause notification area 1105 and an error cause detail message are arranged. In the present case, a message indicating the power-off state of the communication destination apparatus as the error cause is displayed. In addition to the details of the error cause, information for identifying the communication destination apparatus, such as an apparatus name, and the IP address of the communication destination apparatus are displayed. An OK button 1106 is arranged in the error cause notification area 1105. When the OK button 1106 is pressed, the UI control application 301 performs control such that the error cause notification area 1105 is not displayed.

A second exemplary embodiment will be described below. The first exemplary embodiment described above illustrates a method for identifying the cause of an error by using information preliminarily stored in the maintenance server 130 if the error has occurred in a function to be used in the communication between apparatuses. The second exemplary embodiment illustrates a method in which the maintenance server 130 which has received an error notification acquires the latest operation information from the MFP 110b to identify the cause of the error. This method is used, for example, when the operation information about the communication destination MFP 110b is not acquired yet, or when the information recorded in the maintenance server 130 becomes old. Thus, the maintenance server 130 attempts to communicate with the MFP 110b to acquire the latest information, so that a high-accuracy determination can be made. The configuration of the system 100 according to the second exemplary embodiment is similar to the configuration of the system 100 according to the first exemplary embodiment, except for a part associated with the above-described features. Accordingly, in the following description, the same components are denoted by the same reference numerals, and the detailed descriptions thereof are omitted.

<Use Case>

Figure 13:
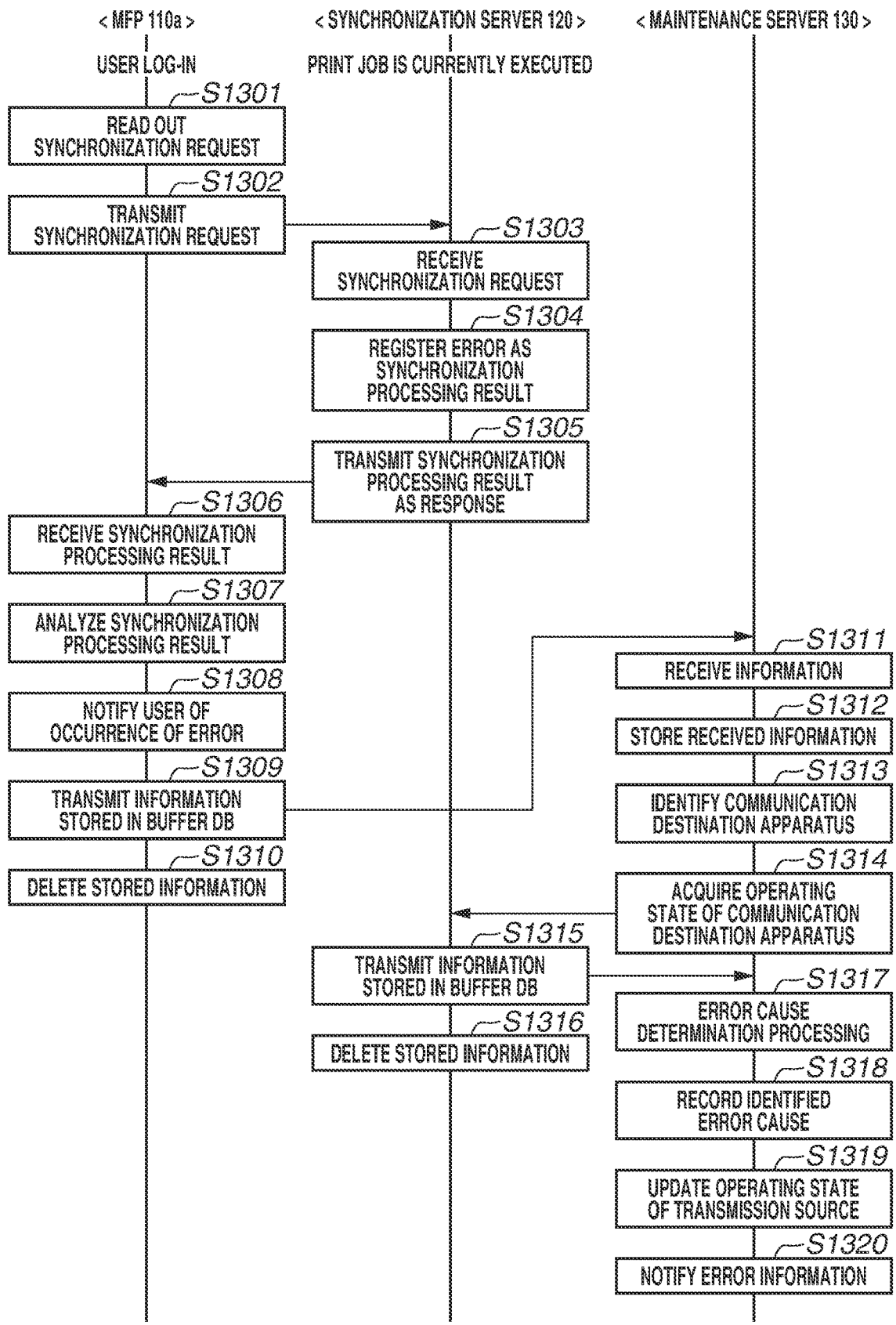
FIG. 13 illustrates a sequence for acquiring latest operation information to identify the cause of an error.

FIG. 13 illustrates a sequence for acquiring the latest operation information to identify the cause of an error. An example in which an error occurs in the synchronization processing of the MFP 110a due to the operation in a high-load state of the synchronization server 120 will now be described.

As illustrated in FIG. 13, the MFP 110a accepts user log-in processing, and in step S1301, the client application 400 reads out a synchronization processing request. In step S1302, the client application 400 transmits the synchronization processing request to the synchronization server 120.

In step S1303, the synchronization server 120 receives the synchronization processing request and determines that the synchronization processing cannot be executed because the MFP 110b is in the high-load state. In step S1304, the synchronization server 120 registers a function inexecutable error as the synchronization processing result. In step S1305, the synchronization server 120 transmits the error information registered as the synchronization processing result as a response to the synchronization processing request from the client application 400.

In step S1306, the client application 400 receives the synchronization processing result from the synchronization server 120. In step S1307, the client application 400 analyzes the received information and records information indicating that the synchronization processing is failed due to a cause on a side of the synchronization server 120. In step S1308, a notification indicating that an error has occurred in the synchronization processing is sent to the UI control application 301. In this case, as illustrated in FIG. 11A, the state notification unit 1104 issues a notification indicating that a synchronization error has occurred. In step S1309, the information collection application 420 transmits the error occurrence information to the maintenance server 130, similar to FIG. 12. In step S1310, the information collection application 420 deletes the transmitted information from the buffer DB 426.

In step S1311, the maintenance server 130 receives the information transmitted from the MFP 110a. In step S1312, the maintenance server 130 stores the received information in the data management unit 504. Here, it is determined that the received information is information about the error that has occurred in the communication between apparatuses, and in step S1313, the communication destination apparatus is identified from the received information. In step S1314, the maintenance server 130 requests the MFP 110b, which is the communication destination of the error that has occurred in the communication between apparatuses, to transmit the latest information.

When the MFP 110b receives the information transmission request, in step S1315, the information collection application 420 transmits the information stored in the buffer DB 426 to the maintenance server 130. In step S1316, the information collection application 420 deletes the transmitted information from the buffer DB 426.

In step S1317, the maintenance server 130 stores the information acquired from the MFP 110b in the data management unit 504, and performs the error cause determination processing based on the information. In the present case, the communication destination MFP 110b transmits print job execution information, and thus it can be determined that the operating state is normal. In the error cause determination processing, in step S1318, it is determined that the MFP is in the function inexecutable state based on the detailed information included in the error information transmitted from the MFP 110a and the determination result is recorded as the error cause. In step S1319, the maintenance server 130 updates the information indicating that the error has occurred in the synchronization processing in the MFP 110a, which has transmitted the information because the function is inexecutable due to the high-load state of the communication destination MFP 110b. In step S1320, the maintenance server 130 sends a notification indicating the updated error information.

<Operating State Update Processing>

According to the present exemplary embodiment, the use case described above is implemented by replacing a part of the processing illustrated in the flowchart of FIG. 9 with the following processing.

In step S909, the operation information determination unit 502 requests the communication control unit 506 to transmit data so as to transmit the data to the identified communication destination MFP 110, by using the information for identifying the communication destination apparatus acquired in step S906. After that, upon receiving a communication response from the information collection application 420 of the data transmission destination MFP, the operation information determination unit 502 instructs the data management unit 504 to register the information. In this case, if the data transmit request fails, or if no response is received from the communication destination MFP 110, the processing is continued without registering the information in the data management unit 504. Further, the operation information determination unit 502 acquires the operating state of the identified communication destination again from the data management unit 504, and executes step S910 and subsequent steps by using the operation information.

A third exemplary embodiment will be described below. According to the methods described in the first and second exemplary embodiments, if an error has occurred in the function of synchronization processing or the like which is used in the communication between apparatuses, the cause of the error can be identified on the maintenance server 130. The third exemplary embodiment illustrates an example in which the MFP 110a that has acquired communication destination operation information from the maintenance server 130 executes the error cause determination processing by using the information. The configuration of the system 100 according to the third exemplary embodiment is similar to the configuration of the system 100 according to the first and second exemplary embodiments, except for a part associated with the above-described features. Accordingly, in the following description, the same components are denoted by the same reference numerals, and the detailed descriptions thereof are omitted.

<Use Case>

Figure 16:
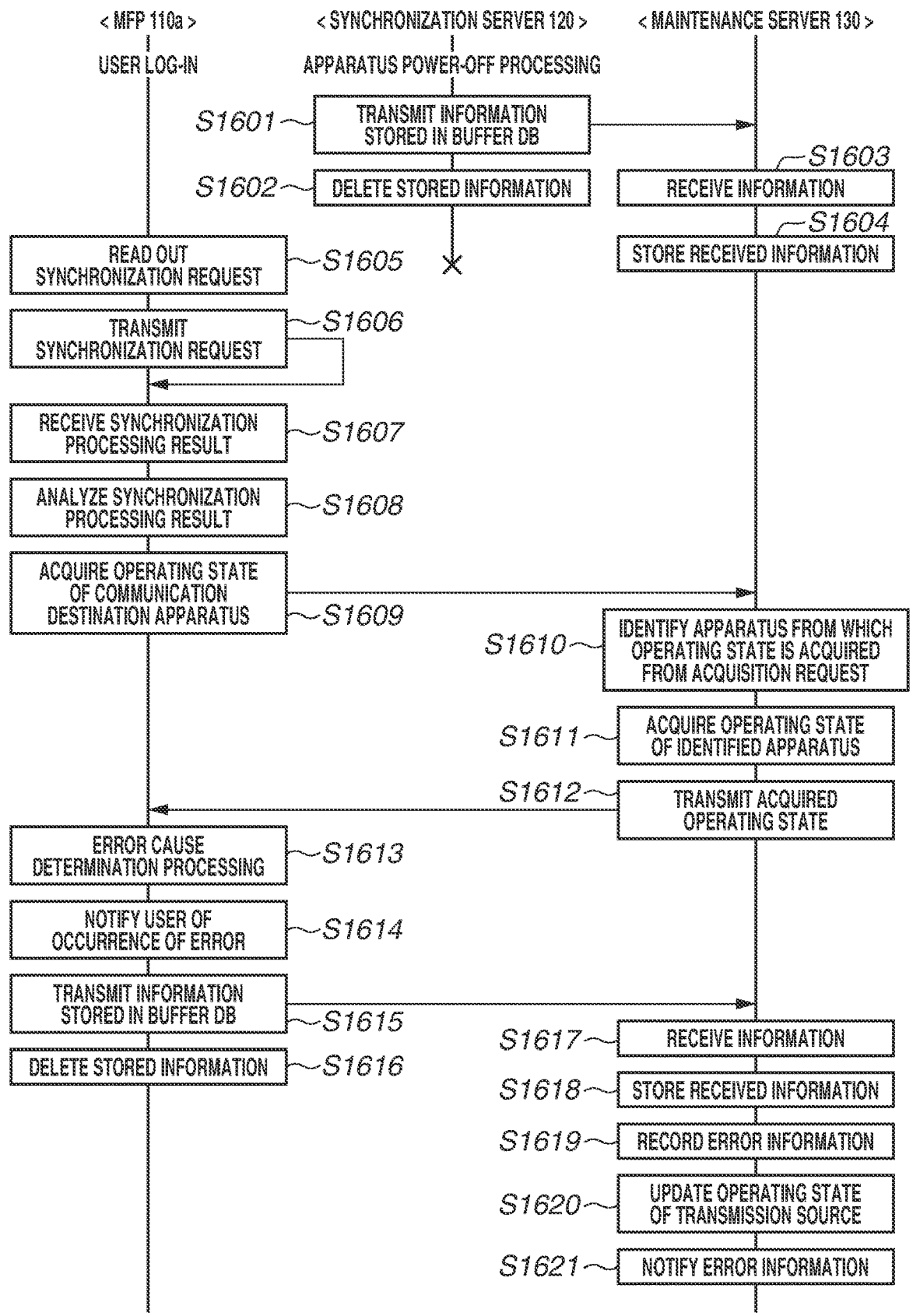
FIG. 16 illustrates a sequence for identifying the cause of an error in the MFP.

FIG. 16 illustrates a sequence for identifying the cause of an error in the MFP. An example will now be described in which an error occurs in the synchronization processing of the MFP 110a due to the power-off state of the MFP 110b in which the synchronization server 120 operates.

As illustrated in FIG. 16, at the time of executing processing to power off the apparatus, in steps S1601 and S1602, the MFP 110b notifies the maintenance server 130 of power-off information. In steps S603 and S1604, the maintenance server 130 stores the received power-off information as the operation information about the MFP 110b. These processes are similar to those described above with reference to FIG. 12. After that, in steps S1605 and S1606, the MFP 110a accepts a user's log-in and transmits a synchronization processing request to the synchronization server 120. In this case, since the MFP 110b in which the synchronization server 120 operates is in the power-off state, the transmission of the synchronization processing request fails, and in step S1607, a communication failure is received as the synchronization processing result. In step S1608, the client application 400 analyzes the synchronization processing result. Since an error has occurred in the synchronization processing, in step S1609, the client application 400 requests the maintenance server 130 to acquire the operation information about the MFP 110b which is the communication destination apparatus.

In step S1610, the maintenance server 130 receives a communication destination operation information acquisition request from the MFP 110a, and identifies the MFP 110b as the apparatus from which the operation information is acquired based on the information included in the acquisition request. In step S1611, the operation information about the identified MFP 110b is acquired. In step S1612, the operation information is transmitted as a response to the operation information acquisition request. In this case, since the operating state of the MFP 110b is the power-off state in which the apparatus is stopped, power-off information is transmitted as the operation information in response to the operation information acquisition request.

Upon receiving the operation information about the communication destination apparatus from the maintenance server 130 as the response to the operation information acquisition request, in step S1613, the MFP 110a executes the error cause determination processing based on the operation information. In this case, since the information received from the maintenance server 130 indicates the power-off information as the operation information about the communication destination MFP 110b, it is determined that the communication destination apparatus in the stopped state. Upon receiving this determination result, in step S1614, a notification indicating that an error has occurred in the synchronization processing due to the power-off state of the communication destination apparatus is sent. At this time, as illustrated in FIG. 11B, information indicating that a synchronization error has occurred, and the cause of the error are displayed in the notification area 1105. Further, the information collection application 420 detects the occurrence of an error, collects the error information and the error cause determination processing result, and stores the collected information in the buffer DB 426. Since the error has occurred due to the communication, the communication destination information and the error detail information are also recorded as the error information. In step S1615, the information collection application 420 transmits, to the maintenance server 130, the information which indicates the occurrence of the error in the synchronization processing and is stored in the buffer DB 426. In step S1616, the information collection application 420 deletes the transmitted information from the buffer DB 426.

In step S1617, the maintenance server 130 receives the information transmitted from the MFP 110a, and in step S1618, the maintenance server 130 stores the received information as the collected data. At this time, the maintenance server 130 determines that the received information includes error information, and in step S1619, the maintenance server 130 records the error information as the operation information about the transmission source MFP 110a. As the MFP 110a has determined the operating state of the MFP 110a, which has transmitted the information, based on the result, in step S1620, the maintenance server 130 records information indicating that the synchronization processing error has occurred due to the power-off state of the communication destination apparatus. In step S1621, the maintenance server 130 sends a notification about the error information and the notification indicating the cause of the error.

With this mechanism, the MFP 110a can acquire the operation information about the communication destination apparatus from the maintenance server 130, and can execute the error cause determination processing. Thus, the cause of the error that has occurred in the communication between apparatuses can be determined without putting a load on the maintenance server 130. In the present exemplary embodiment, the client application 400 of the MFP 110a has a configuration similar to that of the operation information determination unit 502 included in the apparatus maintenance service 500 of the maintenance server 130, in addition to the configuration illustrated in FIG. 4A.

<Synchronization Processing (Client)>

Figure 14:
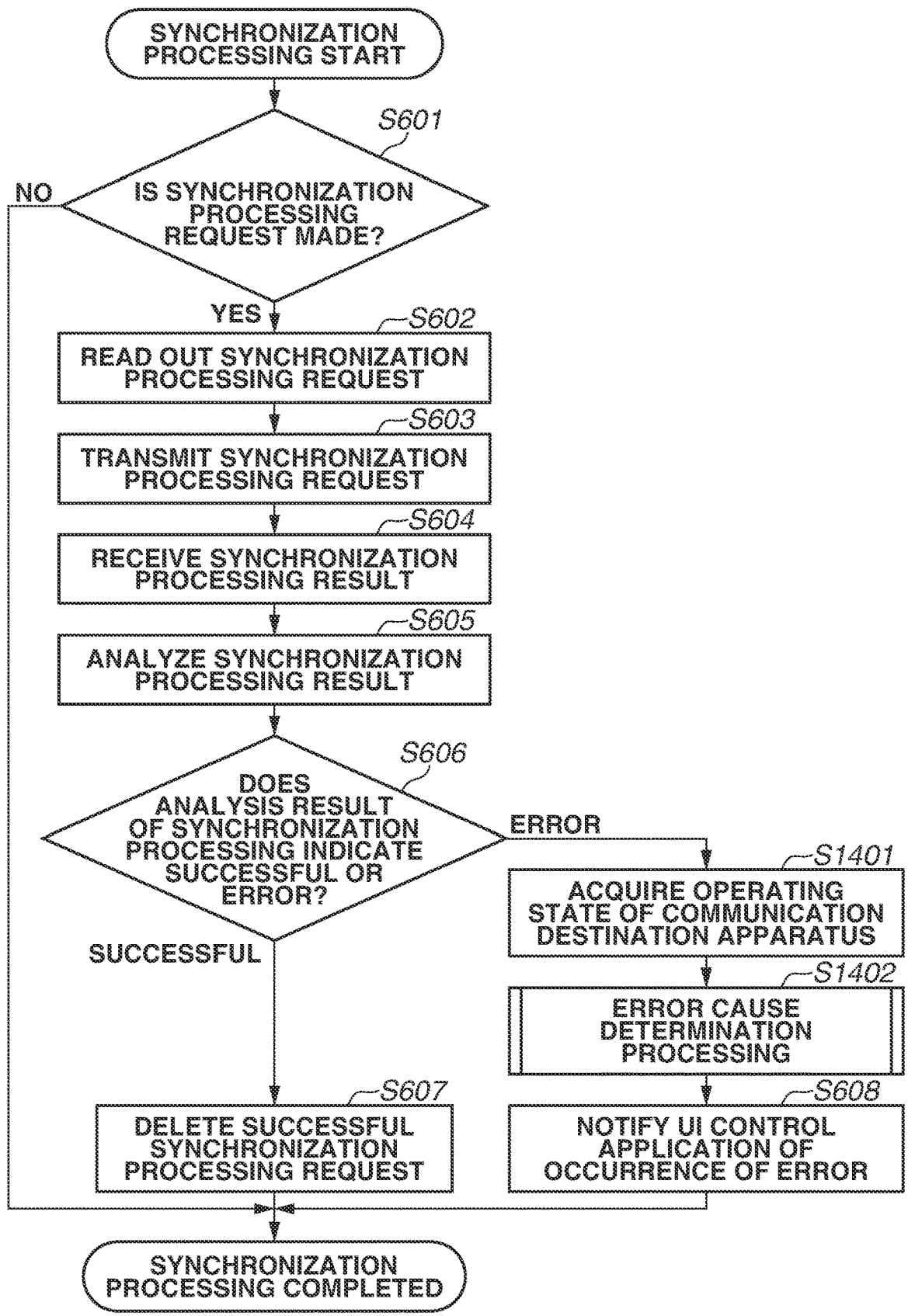
FIG. 14 is a flowchart illustrating synchronization processing to be performed by the client application.

The client application 400 of the MFP 110a executes synchronization request processing illustrated in detail in FIG. 14. Processes in FIG. 14 that are identical to those described above with reference to FIG. 6 are denoted by the same step numbers and the descriptions thereof are omitted. Steps S601 to S606 in the flowchart for the synchronization processing to be performed by the client application 400 are similar to those described above with reference to FIG. 6 in the first exemplary embodiment. According to the present exemplary embodiment, in step S606, if the setting data management unit 401 determines that the identified synchronization processing result indicates success, the processing proceeds to step S607. If the synchronization processing result indicates an error, the processing proceeds to step S1401. The operation of step S607 is similar to that described in the first exemplary embodiment. Each step illustrated in the flowchart of FIG. 14 is implemented in such a manner that the CPU 202 included in the MFP 110 loads a program stored in the storage unit, such as the HDD 205 or the ROM 206, into the RAM 203, and executes the loaded program.

In step S1401, the setting data management unit 401 requests the communication control unit 402 to acquire the operation information about the communication destination apparatus. In the acquisition request, the device ID and the IP address, which are included in the configuration information, are designated to uniquely identify the communication destination apparatus. The communication control unit 402 transmits the operation information acquisition request to the maintenance server 130, and receives the acquisition request result. The communication control unit 402 notifies the setting data management unit 401 of the acquired operation information about the communication destination. The setting data management unit 401 notifies the operation information determination unit 502 of the acquired communication destination information and the processing result of the synchronization processing request analyzed in step S605, and the processing proceeds to step S1402.

In step S1402, the operation information determination unit 502 performs the error cause determination processing for determining the cause of the error that has occurred in the function for performing communication between apparatuses based on the information acquired in step S1401. The client application 400 executes the error cause determination processing that is the same as the processing described above with reference to FIG. 10. After completion of the error cause determination processing, the operation information determination unit 502 notifies the setting data management unit 401 of the determination result, and the processing proceeds to step S1403.

In step S1403, the setting data management unit 401 notifies the UI control application 301 of the result of the determination made in step S1402. The UI control application 301 receives the error cause determination result, and displays information indicating the cause of the failure in the synchronization processing on the display unit 211 as illustrated in FIG. 11B. Further, the setting data management unit 401 notifies the information collection application 420 of the details of the failed synchronization processing and the error cause determination result. The setting data management unit 401 registers the information so as to re-execute this processing flow after a predetermined period, and the flowchart ends.

<Operation Information Acquisition Processing>

Figure 15:
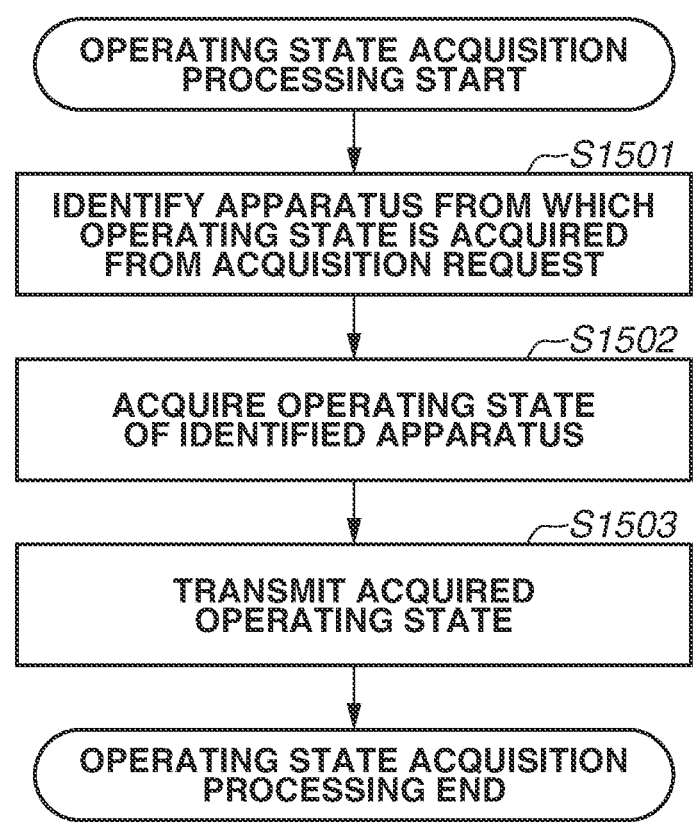
FIG. 15 is a flowchart illustrating operating state acquisition processing to be performed by the apparatus maintenance service.

A processing procedure for the maintenance server 130 to accept operation information acquisition processing from the MFP 110a will be described with reference to FIG. 15. FIG. 15 is a flowchart illustrating operating state acquisition processing to be performed by the apparatus maintenance service 500. This flowchart is implemented in such a manner that the CPU 252 loads a program stored in the ROM 256 or the HDD 255 into the RAM 253, and executes the loaded program. This flowchart illustrates processing to be performed from when the communication control unit 506 of the apparatus maintenance service 500 receives the operation information acquisition request from the MFP 110.

In step S1501, the data management unit 504 acquires, from the received operation information acquisition request, information for identifying the apparatus from which information is to be acquired. Here, the device ID and the IP address, which are configuration information about the communication destination apparatus and are included in the operation information acquisition request, are identified. Further, the data management unit 504 sends an instruction to acquire the identified apparatus information, and the processing proceeds to step S1502.

In step S1502, the data management unit 504 designates the apparatus identified in step S1501, and acquires the operation information about the apparatus from the operation information DB 505. The data management unit 504 sends, to the communication control unit 506, a notification indicating that the acquired operation information is to be transmitted as a response to the request, and the processing proceeds to step S1503.

In step S1503, the communication control unit 506 transmits the information acquired in step S1502 as the response to the request to the apparatus which has transmitted the operation information acquisition request, and the flowchart ends.

OTHER EXEMPLARY EMBODIMENTS

Embodiments can also be implemented in the processing where a program for implementing one or more functions according to the exemplary embodiments described above is supplied to a system or apparatus via a network or storage medium, and one or more processors in a computer of the system or apparatus read out and execute the program. Embodiments can also be implemented by a circuit (for example, an application specific integrated circuit (ASIC)) for implementing one or more functions according to the exemplary embodiments described above.

The present disclosure is applicable to a system composed of a plurality of devices, and is also applicable to an apparatus composed of a single device. For example, the functions according to the exemplary embodiments described above can be implemented by a configuration in which some of software modules are executed by an external server to acquire the processing result of the external server. For example, a storage unit that stores data may be provided in the external server.

The present invention is not limited to the exemplary embodiments described above. Various modifications (including arbitrary combinations of the exemplary embodiments described above) can be made based on a gist of the present invention, and these modifications are not excluded from the scope of the present invention. For example, all configurations obtained by combining the exemplary embodiments described above and/or modified examples thereof are also included.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-194672, filed Oct. 15, 2018, which is hereby incorporated by reference herein in its entirety.

What is claimed is:

1. A communication system comprising:
    a communication apparatus configured to communicate with an external apparatus; and
    an information processing apparatus configured to manage operation log information about the external apparatus,
    wherein the information processing apparatus comprises at least one controller configured to:
    acquire the operation log information about the external apparatus; and
    transmit, upon receiving a notification from the communication apparatus, state information based on the operation log information to the communication apparatus, the notification indicating a communication error in communication between the external apparatus and the communication apparatus, and
    wherein the communication apparatus comprises:
    a display device configured to display information; and
    at least one controller configured to:
    notify, upon detecting that the communication with the external apparatus is not performed normally, the information processing apparatus of the communication error; and
    acquire the state information and cause the display device to display a message based on the state information.

2. The communication system according to claim 1, wherein the controller of the information processing apparatus determines, based on at least the operation log information, whether a communication destination indicated by apparatus information is an invalid communication destination.

3. The communication system according to claim 1, wherein the controller of the information processing apparatus determines, based on at least the operation log information, whether the external apparatus is operating.

4. The communication system according to claim 1, wherein the controller of the information processing apparatus determines, based on at least the operation log information, whether an error has occurred in a communication destination indicated by apparatus information.

5. The communication system according to claim 1, wherein the controller of the information processing apparatus determines, based on at least the operation log information, whether a communication environment of the external apparatus is normal.

6. The communication system according to claim 1, wherein the controller of the information processing apparatus determines, based on at least the operation log information, whether a communication function of the external apparatus is deactivated.

7. The communication system according to claim 1, wherein the controller of the information processing apparatus determines, based on at least the operation log information, whether another processing is executed in the external apparatus in preference to the communication with the communication apparatus.

8. The communication system according to claim 1, wherein the controller of the information processing apparatus attempts to communicate with the external apparatus, acquires a communication result, and outputs the state information about the external apparatus based on at least the communication result and the operation log information.

9. An information processing apparatus configured to manage operation log information about an external apparatus and communicate with a communication apparatus communicating with the external apparatus, the information processing apparatus comprising at least one controller configured to:
    acquire the operation log information about the external apparatus; and
    transmit, upon receiving a notification from the communication apparatus, state information based on the operation log information, to the communication apparatus, the notification indicating a communication error in communication between the external apparatus and the communication apparatus,
    wherein a message based on the state information is displayed on the communication apparatus.

10. The information processing apparatus according to claim 9, wherein the controller determines, based on at least the operation log information, whether a communication destination indicated by apparatus information is an invalid communication destination.

11. The information processing apparatus according to claim 9, wherein the controller determines, based on at least the operation log information, whether the external apparatus is operating.

12. The information processing apparatus according to claim 9, wherein the controller of the information processing apparatus determines, based on at least the operation log information, whether an error has occurred in a communication destination indicated by apparatus information.

13. The information processing apparatus according to claim 9, wherein the controller determines, based on at least the operation log information, whether a communication environment of the external apparatus is normal.

14. The information processing apparatus according to claim 9, wherein the controller determines, based on at least the operation log information, whether a communication function of the external apparatus is deactivated.

15. The information processing apparatus according to claim 9, wherein the controller determines, based on at least the operation log information, whether another processing is executed in the external apparatus in preference to the communication with the communication apparatus.

16. The information processing apparatus according to claim 9, wherein the controller attempts to communicate with the external apparatus, acquires a communication result, and outputs the state information about the external apparatus based on at least the communication result and the operation log information.

17. A control method for an information processing apparatus, the information processing apparatus being configured to manage operation log information about an external apparatus and communicate with a communication apparatus configured to communicate with the external apparatus, the control method comprising:
   acquiring the operation log information about the external apparatus; and
   transmitting, upon receiving a notification from the communication apparatus indicating a communication error between the external apparatus and the communication apparatus, state information based on the operation log information to the communication apparatus,
   wherein a message based on the state information is displayed on the communication apparatus.

* * * * *